(12) United States Patent
Pestana

(10) Patent No.: US 10,915,531 B2
(45) Date of Patent: Feb. 9, 2021

(54) ALGEBRAIC QUERY LANGUAGE (AQL) DATABASE MANAGEMENT SYSTEM

(71) Applicant: California Institute of Technology, Pasadena, CA (US)

(72) Inventor: Marc Kidwell Pestana, Los Angeles, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 341 days.

(21) Appl. No.: 15/237,295

(22) Filed: Aug. 15, 2016

(65) Prior Publication Data
US 2017/0046391 A1    Feb. 16, 2017

Related U.S. Application Data

(60) Provisional application No. 62/374,588, filed on Aug. 12, 2016, provisional application No. 62/205,568, filed on Aug. 14, 2015.

(51) Int. Cl.
*G06F 16/2455* (2019.01)
*G06F 16/2452* (2019.01)
*G06F 16/28* (2019.01)

(52) U.S. Cl.
CPC .. *G06F 16/24553* (2019.01); *G06F 16/24522* (2019.01); *G06F 16/28* (2019.01)

(58) Field of Classification Search
CPC ........... G06F 17/30483; G06F 17/3043; G06F 16/24522; G06F 16/24553; G06F 16/28
See application file for complete search history.

(56) References Cited

U.S. PATENT DOCUMENTS

| | | | | |
|---|---|---|---|---|
| 6,560,595 B1 | 5/2003 | Sanders et al. | | |
| 7,152,073 B2* | 12/2006 | Gudbjartsson | ........ | G06F 16/284 |
| 7,693,900 B2* | 4/2010 | Wilmering | ............ | G06F 16/367 |
| | | | | 707/713 |
| 7,756,904 B2* | 7/2010 | Draper | ................ | G06F 17/2205 |
| | | | | 707/803 |
| 7,769,783 B2* | 8/2010 | Rozenshtein | ........... | G06F 17/10 |
| | | | | 707/793 |

(Continued)

OTHER PUBLICATIONS

International Search Report and Written Opinion dated Oct. 27, 2016 for PCT Application No. PCT/US16/47095 filed on Aug. 15, 2016.

(Continued)

*Primary Examiner* — Miranda Le
(74) *Attorney, Agent, or Firm* — Gates & Cooper LLP

(57) ABSTRACT

A method and system provide an algebraic database management system (ADBMS) that maintains ADBMS type system. The type system includes an ADBMS type database (ATD) and provides a collection of rules that assign a type to constructs. The ATD is a catalog with each record holding typing information. An interpreter dynamically processes, at execution time, a query (that is syntactically modeled on relational algebra). The interpreter: determines inputs of the query; searches the ATD for a data type of each of the inputs, determines compatibility between each of data types of the inputs based on an operator of the query, determines a resultant of the query and a data type of the resultant (based on the operator of the query), and saves the resultant of the query by adding a new record in the catalog.

20 Claims, 15 Drawing Sheets

(56) References Cited

U.S. PATENT DOCUMENTS

| | | | | |
|---|---|---|---|---|
| 7,865,526 | B2* | 1/2011 | Butler | G06F 16/288 |
| | | | | 707/793 |
| 7,945,557 | B2* | 5/2011 | Cheng | G06F 16/24539 |
| | | | | 707/713 |
| 7,958,074 | B2* | 6/2011 | Uceda-Sosa | G06N 5/043 |
| | | | | 706/46 |
| 8,364,612 | B2* | 1/2013 | Van Gael | G06N 20/00 |
| | | | | 706/12 |
| 8,572,124 | B2* | 10/2013 | Behal | G06F 17/30 |
| | | | | 707/794 |
| 8,583,687 | B1* | 11/2013 | Piedmonte | G06F 16/278 |
| | | | | 707/776 |
| 8,667,018 | B2* | 3/2014 | Rafiq | G06F 17/30306 |
| | | | | 707/705 |
| 8,775,482 | B2* | 7/2014 | Chkodrov | G06F 16/24568 |
| | | | | 707/803 |
| 9,158,768 | B2* | 10/2015 | Lakshminath | G06F 21/6227 |
| 9,171,039 | B2* | 10/2015 | Teichmann | G06F 17/30448 |
| 9,558,240 | B2* | 1/2017 | Yan | G06F 16/24537 |
| 2002/0083049 | A1* | 6/2002 | Forster | G06F 17/30286 |
| 2003/0236764 | A1* | 12/2003 | Shur | G06F 16/284 |
| 2004/0015516 | A1* | 1/2004 | Harter | G06F 16/24539 |
| 2004/0210445 | A1* | 10/2004 | Veronese | G06F 8/10 |
| | | | | 705/1.1 |
| 2005/0015591 | A1* | 1/2005 | Thrash | G06F 21/33 |
| | | | | 713/166 |
| 2005/0177556 | A1* | 8/2005 | Fang | G06F 17/30436 |
| 2005/0187955 | A1* | 8/2005 | Bahulkar | G06F 16/289 |
| 2006/0155719 | A1* | 7/2006 | Mihaeli | G06F 16/28 |
| 2006/0235900 | A1* | 10/2006 | Anonsen | G06F 16/289 |
| 2007/0260582 | A1 | 11/2007 | Liang | |
| 2007/0299892 | A1* | 12/2007 | Nakahara | G06F 9/4491 |
| | | | | 708/200 |
| 2008/0168088 | A1* | 7/2008 | Ahmad | G06F 11/0727 |
| 2009/0094216 | A1* | 4/2009 | Hou | G06F 16/2452 |
| 2010/0063968 | A1 | 3/2010 | Sheu et al. | |
| 2011/0112811 | A1* | 5/2011 | Matsumoto | G06F 17/10 |
| | | | | 703/2 |
| 2012/0041943 | A1 | 2/2012 | Piedmonte | |
| 2013/0226959 | A1* | 8/2013 | Dittrich | G06F 16/2453 |
| | | | | 707/769 |
| 2013/0346393 | A1* | 12/2013 | Moll | G06F 17/11 |
| | | | | 707/722 |
| 2014/0379740 | A1* | 12/2014 | Kaplan | G06F 3/04842 |
| | | | | 707/756 |

OTHER PUBLICATIONS

Jacobs, D., "A Type System for Algebraic Database Programming Languages", Proceedings of the 2nd Int'l workshop on Database programming languages, pp. 238-247, Jul. 11, 1989. http://dl.acm.org/citation.cfm?id=94894>.

"Berkeley DB"; Wikipedia, the free encyclopedia, last modified Nov. 28, 2016. http://en.wikipedia.org/wiki/Berkeley_DB.

"Chomsky hierarchy"; Wikipedia, the free encyclopedia; last modified Oct. 21, 2016. https://en.wikipedia.org/wiki/Chomsky_hierarchy.

"Production (computer science)"; Wikipedia, the free Encyclopedia; last modified May 16, 2015. https://en.wikipedia.org/wiki/Production_(computer_science).

"Relation (database)"; Wikipedia, the free encyclopedia; last modified Oct. 5, 2016. http://en.wikipedia.org/wiki/Relation_(database).

"Relational Algebra"; Wikipedia, the free encyclopedia; last modified Nov. 25, 2016. https://en.wikipedia.org/wiki/Relational_algebra.

"Talk:Berkeley DB"; Wikipedia, the free encyclopedia; WikiProject Computing / Software; last modified Oct. 21, 2016. http://en.wikipedia.org/wiki/Talk:Berkeley_DB.

"Talk:Relational Database"; Wikipedia, the free encyclopedia; WikiProject Computing; WikiProject Databases / Computer Science; WikiProject Computer science; Dec. 20, 2016. http://en.wikipedia.org/wiki/Talk:Relational_database.

"University Corporation for Atmospheric Research | Understanding atmospher, Earth, and Sun"; NCAR/UCAR; retrieved Dec. 20, 2016. http://www2.ucar.edu.

Aho, A. V., et al.; "p Compilers: Principles, Techniques, <§ Tools", Second Edition; Michael Hirsch (Executive Editor); Published by Pearson, Addison Wesley; 1986. ISBN: 0-321-48681-1.

Codd, E. F., "A Relational Model of Data for Large Shared Data Banks", Communications of the ACM, vol. 13, No. 6, pp. 377-387, Jun. 1970.

Codd, E. F.; "The Relational Model For Database Management", Version 2; published by Addison-Wesley Publishing Company, p. 538, 1990. ISBN: 0-201-14192-2.

De Haan, L., et al., "Applied Mathematics fro Database Professionals", 1st Edition, Chapter 7—Specifying Database Designs, , New York, New York, USA: Apress, 2006, pp. 139-184.

Hajj, G. A., et al.; "CHAMP and SAC-C atmospheric occultation results and intercomparisons"; Journal of Geophysical Research, vol. 109, 24; Oct. 29, 2004.

Herstein, I. N.; "Topics in Algebra", Second Edition; University of Chicago; published by John Wiley & Sons; 1975; p. 388. Library of Congress Catalog Card No. 74-82577.

Scott, M. L.; "Programming Language Pragmatics", Third Edition; Department of Computer Science, University of Rochester; Published by Elsevier, Morgan Kaufmann Publishers; Mar. 23, 2009. ISBN: 9780123745149.

Sipser, M., "Introduction to the Theory of Computation", Second Edition, Massachusetts Institute of Technology, Mac Mendelsohn (Executive Editor), Published by Thomson Course Technology, 2006. ISBN: 0-534-95097-3.

\* cited by examiner

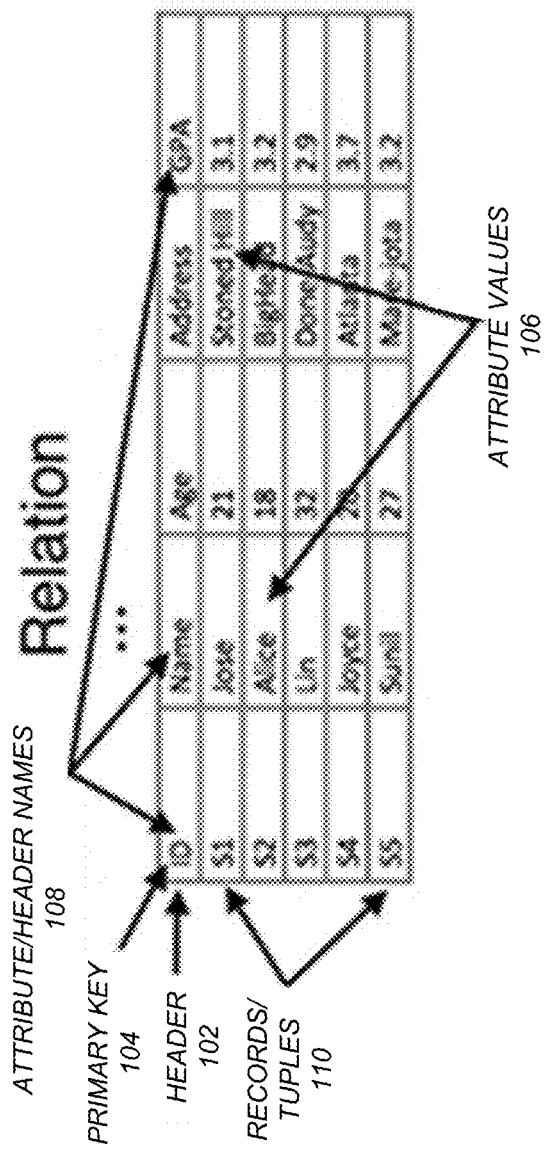

FIG. 3

| OBJECT_NAME | O_PERIOD | CLASS |
|---|---|---|
| Mercury | 87.969 d | Planet |
| Hyperion | 21.276 d | Moon |
| Uranus | 30,688.5 d | Planet |
| 3 Juno | 1594.18 d | MinorPlanet |

P

**

| TASK |
|---|
| db1 |
| db2 |

Q

=

| OBJECT | O_PERIOD | CLASS | TASK |
|---|---|---|---|
| Mercury | 87.969 d | Planet | db1 |
| Hyperion | 21.276 d | Moon | db1 |
| Uranus | 30,688.5 d | Planet | db1 |
| 3 Juno | 1594.18 d | MinorPlanet | db1 |
| Mercury | 87.969 d | Planet | db2 |
| Hyperion | 21.276 d | Moon | db2 |
| Uranus | 30,688.5 d | Planet | db2 |
| 3 Juno | 1594.18 d | MinorPlanet | db2 |

| Name | EmpID | DeptName |
|---|---|---|
| Harry | 3515 | Finance |
| Sally | 2241 | Sales |
| George | 3401 | Finance |
| Harriet | 2202 | Production |

P

&&

| DeptName | Manager |
|---|---|
| Finance | George |
| Sales | Harriet |
| Production | Charles |

Q

=

| Name | EmpID | DeptName | Manager |
|---|---|---|---|
| Harry | 3515 | Finance | George |
| Sally | 2241 | Sales | Harriet |
| George | 3401 | Finance | George |
| Harriet | 2202 | Production | Charles |

| IGNEOUS_ROCK | SAMPLES | FORMATION | TEXTURE | COLOR |
|---|---|---|---|---|
| Andesite | 5 | Extrusive | Fine | Medium |
| Granite | 12 | Intrusive | Coarse | Light |
| Diorite | 3 | Intrusive | Coarse | Mixed |
| Basalt | 18 | Extrusive | Fine | Dark |
| Obsidian | 1 | Extrusive | Glassy | Black |
| Gabbro | 6 | Intrusive | Coarse | Dark |

$P ::= (@SAMPLES < 6\ \&\ @IGNEOUS\_ROCK\ .ne.\ "Obsidian")\ |\ @TEXTURE\ .eq.\ "Fine"$

| IGNEOUS_ROCK | SAMPLES | FORMATION | TEXTURE | COLOR |
|---|---|---|---|---|
| Andesite | 5 | Extrusive | Fine | Medium |
| Diorite | 3 | Intrusive | Coarse | Mixed |
| Basalt | 18 | Extrusive | Fine | Dark |

FIG. 7

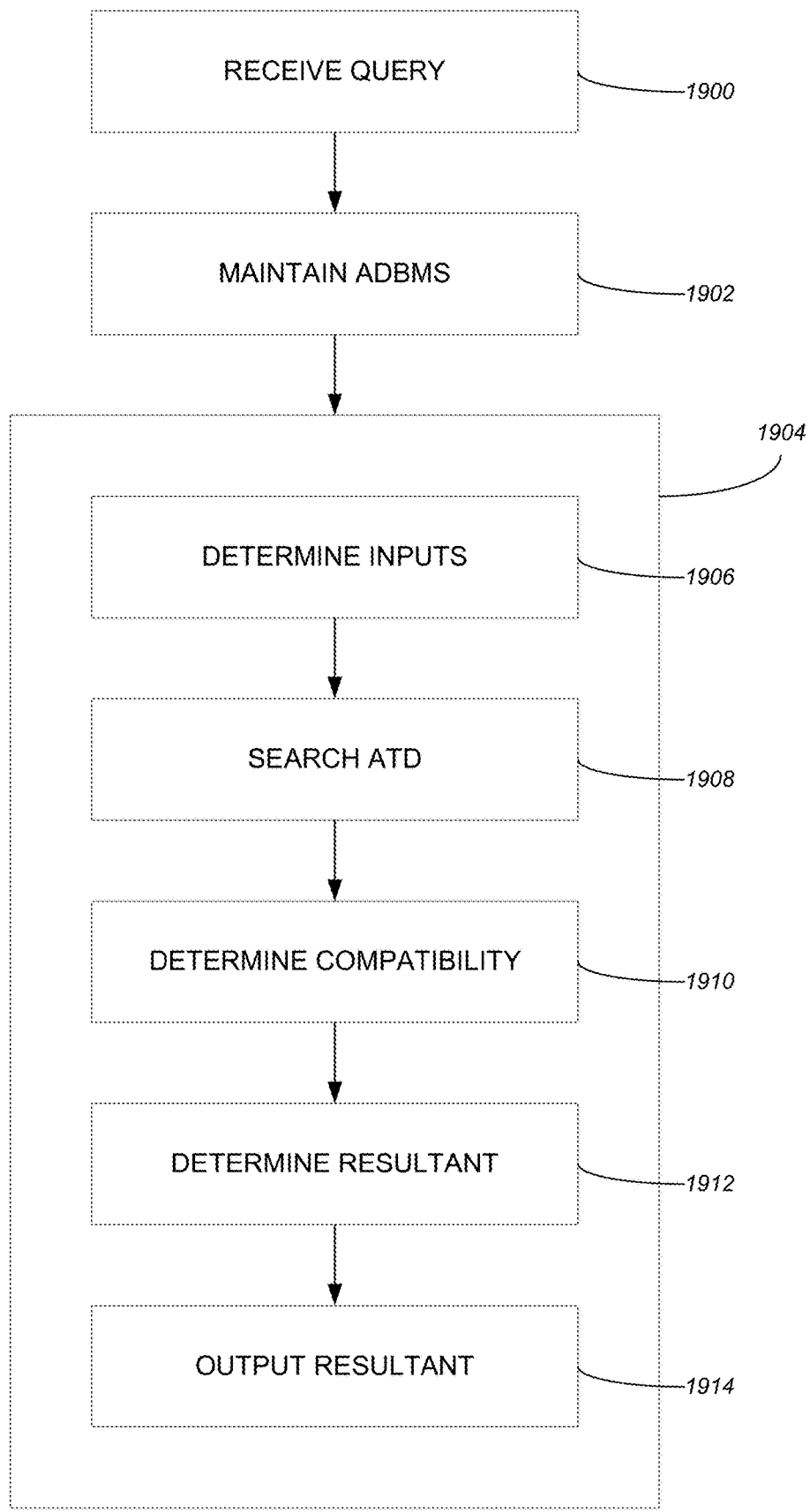

ALGEBRAIC QUERY LANGUAGE (AQL) DATABASE MANAGEMENT SYSTEM

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 62/205,568, filed on Aug. 14, 2015, with inventor (s) Marc K. Pestana and Olga P. Verkhoglyadova, entitled "Algebraic Query Language (AQL) Database Management System (ADBMS). An Alternative Relational Database Interface and Database Management System,"; and Provisional Application Ser. No. 62/374,588, filed on Aug. 12, 2016, with inventor(s) Marc K. Pestana, entitled "Algebraic Query Language (AQL) Database Management System (ADBMS). An Alternative Relational Database Interface and Database Management System,".

STATEMENT REGARDING FEDERALLY SPONSORED RESEARCH AND DEVELOPMENT

The invention described herein was made in the performance of work under NASA Contract NNN12AA01C and is subject to the provisions of Public Law 96-517 (35 USC 202) in which the Contractor has elected to retain title.

BACKGROUND OF THE INVENTION

1. Field of the Invention

The present invention relates generally to database systems, and in particular, to a method, system, apparatus, and article of manufacture for providing an algebraic query language (AQL) and functional database management system ("AQL DBMS" or "ADBMS").

2. Description of the Related Art (Note: This application references a number of different publications as indicated throughout the specification by reference numbers/letters enclosed in brackets, e.g., [x]. A list of these different publications can be found below in the section entitled "References." Each of these publications is incorporated by reference herein.)

Global Positioning System (GPS) Earth Observatory (GPS Earth Observatory—GEO) systems consume large amounts of data generated by an exploitation of the GPS satellite constellation to perform climate, weather, and ionospheric research. GEO may also consume non-satellite constellation based data (and third party data), and must derive metrics such as an analysis of data throughput and the co-location of occultations from different satellites. As such data may originate from real world sources, there is a constant issue with incomplete data. Further, importing/migrating and accessing/manipulating/using such data in a flexible database management system (DBMS) has been problematic. In particular, the data migration problem could not be efficiently or securely addressed by existing database management solutions. To better understand these problems, a description of GEO systems and prior art DBMS and their deficiencies may be useful.

GEO systems may have many requirements [Hajj 2004] including GPS data importation and manipulation, and a constraint that existing prior art SQL (structured query language) database query languages are not acceptable for "security reasons." SQL query languages are designed for managing data held in a relational DBMS. Prior art relational database models are based on a unique set of requirements described by E. F. Codd's relational model [Codd E. F., 1990]. GEO systems have different requirements compared to that of Codd's relational model. For example, GEO systems require the ability to manage and analyze highly dynamic data environments: data that is not necessarily integrated, relations that may be wholly incompatible with one another (nulls in one relation and not in another, common domains named differently, etc.), incomplete data sets, and very large datasets provided in differing formats by outside entities. In this regard, GEO systems are scientific and engineering project based, and not business accounting systems.

Accordingly, what was needed was a concise and flexible database management system.

SUMMARY OF THE INVENTION

Embodiments of the invention provide a database query language (known as AQL) and a functional DBMS. The syntax is object-oriented, very strongly typed, and is distinguishable from C and SQL. In contrast to prior art database languages, AQL does not restrict typing to table headers and attributes, but instead relations become types. Embodiments of the invention treat relational databases as types, just as practitioners of the art view integers, strings, or reals as types. In this regard, prior art database systems force the user to configure the structure of query results before actually making queries. Embodiments of the invention type relations (i.e. tables, databases) dynamically "on-the-fly". Such a process allows structural changes to databases to be applied rapidly and automatically, at the discretion of the programmer/practitioner. Consequently, there is minimal or no effort required to introduce tables into the AQL ADBMS. This allows databases of different structures to be quickly queried without extensive study of their properties.

Embodiments of the invention utilize queries which are written in an algebraic syntax. Embodiments are object-oriented, but the code "looks like algebra", not a verbose language like SQL, C, or PYTHON.

Embodiments of the invention consider database tables as an infinite set of objects that break down into Equivalence Classes by their types. Those types are determined by the AQL ADBMS from three principle sources: the practitioner of the art (the user) via configuration tables, AQL's unary, binary, and function operators automatically at run time, and complex AQL expressions involving those operators. Thus, embodiments of the invention provide a naturally recursive syntax. This facilitates the free and rapid development of database queries limited only by the creativity of the practitioner of the art. Accordingly, AQL supports an open workflow.

Potential applications of embodiments of the invention include Astronomy, Bioinformatics, Language Analysis, Data Mining, Industrial Process Optimization, Financial Modelling and Education. In addition, teaching AQL together with relational algebra and as a pre-cursor to SQL makes AQL an ideal educational tool.

BRIEF DESCRIPTION OF THE DRAWINGS

Referring now to the drawings in which like reference numbers represent corresponding parts throughout:

FIG. 1 illustrates a pictorial representation of E. F. Codd's relation;

FIG. 2 illustrates an exemplary execution of the rename operator in accordance with one or more embodiments of the invention;

FIG. 3 illustrates an exemplary execution of the Cartesian Product operator in accordance with one or more embodiments of the invention;

FIG. 4 illustrates an exemplary execution of the Natural Join operator in accordance with one or more embodiments of the invention;

FIG. 5 illustrates an illustration of the projection of P onto @A and @B in accordance with one or more embodiments of the invention;

FIG. 6 illustrates the AQL code for P divided by Q is P\\Q in accordance with one or more embodiments of the invention;

FIG. 7 illustrates an example of the restriction/selection operation in accordance with one or more embodiments of the invention;

FIG. 19 illustrates the logical flow for maintaining an algebraic database management system (ADBMS) in accordance with one or more embodiments of the invention.

DETAILED DESCRIPTION OF THE PREFERRED EMBODIMENTS

Figure 8:
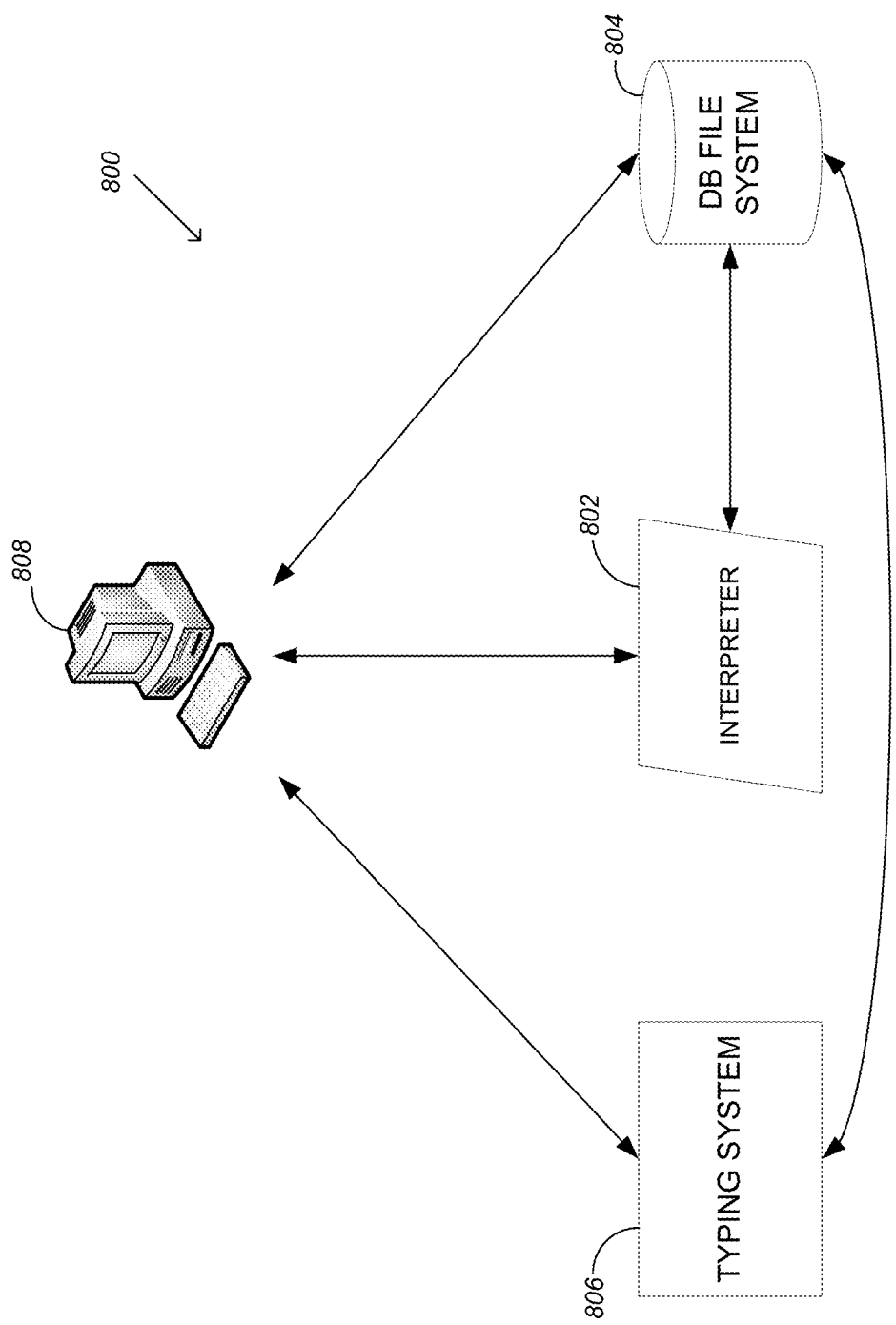
FIG. 8 illustrates an overview of the ADBMS in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention have many differences from other relational database systems, including those that are implementations of Codd's relational algebra [Codd, E. F. 1970]. Embodiments of the invention do not use business rules to protect data, but instead use a buffering system. Embodiments do not restrict the user, they warn. Embodiments do not share semantics or syntax with SQL. Syntax is algebraic, eschewing verbose English syntax. Embodiments are not only designed primarily for data consistency, but also designed for maximum agility and choice. Embodiments are not limited to query, but also compute. Embodiments are relatively concise and flexible, and users are presupposed to be advanced practitioners of the art.

Several interesting concepts and innovations have grown out of the development and use of embodiments of the invention:

1. A software development methodology that permits rapid inclusion of new features such as new algebraic operators, new grammatical rules, data types, language tokens and expressions.
2. Relations themselves are typed as such, by the attribute set of the relation and its domain, and by primary key attribute(s).
3. An automated and dynamic typing system, which includes the type configuration table and ADBMS type database. This automation permits the rapid inclusion of new data types, rapid typing of relations, and dynamic type allocation resulting from algebraic operations. The AQL operators automate the determination of the types of their inputs, and construct the types of their outputs. This process gives the AQL operators "type sensitivity."
4. The ADBMS type construct for relations includes other properties that are used to speed operation and determine data presentation, but have no bearing on relations as types.
5. AQL creates, reads, updates, and deletes data from a relational database. This system complies with the standard CRUD (Create, Read, Update, Delete) architecture for Database Query Languages (i.e., a set of elemental functions of a persistent database).
6. A matrix is the closest numerical structure to the database. AQL is compatible with, and is inspired by, matrix algebra as well as relational algebra, and uses some of its operators. There is a built-in matrix type in AQL, and one may use matrix operators in AQL queries. Conversely, the mathematical definition of a matrix provides a model of the type definition of relations, as well as the type-sensitivity of AQL operators.
7. Algebraic closure is enforced, as such.
8. Object-oriented polymorphism is exploited creatively in the architecture of the scanner and interpreter, allowing the process of expanding the operator base to be streamlined.
9. The algebraic expressions use mid-fix notation, yet are processed by the interpreter into post-fix expressions.
10. AQL is a context free language, a formal grammar that conforms to the Chomsky hierarchy [WikiProjects, 2016] This formal grammar is translated directly into the structure of the parser.
11. In one or more embodiments, the query may contain a scalar expression that, when executed by the interpreter, results in numerical, string, or logical constant. Such a scalar expression may be a statistical expression that acts on sets of records and produces an aggregate value for each set. Alternatively, the scalar expression may be a string expression that includes strings and/or string functions.
12. While based upon relational algebra, AQL contains necessary non-relational operators.

AQL is designed for data migration. It does not rely upon a fixed system of tables, but consists of a dynamic set of relations that contracts or expands based upon project needs. In service of this goal, it can integrate, disintegrate, normalize, de-normalize or align, with the ultimate goal of providing this tool to the advanced practitioner, facilitating the rapid acquisition and development of data analytics. In one or more embodiments of the invention, AQL may be written in PERL using the BERKELEY DB software library [Seltzer & Bostic, 1994]. Such embodiments support the rapid prototyping workflow required by project GEO, and provide simple database functionality as a starting point for development. However, embodiments of the invention are not inherently limited to such an implementation.

Relational Algebra

Embodiments of the invention present a new model used in AQL. The relational models of E. F. Codd [Codd E. F., 1990], SQL [Date, 2013] and of AQL share a basis in relational algebra, which is an abstract system. Since the term "abstract" is a highly subjective one, the methods used to define general algebraic systems and relational algebra in particular will be contrasted. General abstract algebraic concepts underlie critical components of this relational model, so a brief treatment is included here.

Contrasting Abstract Algebra & Relational Algebra

The subject of abstract algebra begins with a methodology for defining algebraic systems. For the sake of brevity, one may say that the definition of any abstract algebraic system begins with the assertion of the existence of a non-empty set S of elements, one or more binary operations on those elements, axioms that stipulate rules for the use of the binary operations, and the existence of special elements in S (0 and 1 being the most common, and called the identity elements which are defined strictly by their function, not their structure). Note that the elements of S are undefined, they are simply assumed to exist. Nothing about their structure or character is provided by this definition. [Herstein, 1975].

Operations are typically denoted by symbols that are called operators (+ and · being the most common). The most fundamental assumption made by all such algebraic systems is that the binary operations are closed. That for all the elements of S, where $a \in S$ and $b \in S$, $a+b \in S$ and $a \cdot b \in S$. By definition then, such operators have closure: all possible operations result in values contained in S. For example, in the integers, addition and multiplication are obviously closed. But furthermore, addition and multiplication in the integers merely provide an example of + and ·. Integers are not abstract in this context, they are a specified number system. The precise behavior of these operators conform to their abstract counterparts.

Axioms often include other rules concerning the behavior of the operators on the elements of A. For example, the axiom $a \in S$ and $b \in S$, then $a+b=b+a$ states that the commutative law holds for +. This law holds for the elements of S without defining the elements of S. The generality of the elements of S and the operations upon S illustrate the nature of abstract algebraic systems.

The definition of relational algebra begins with the specification of the structure of its elements that are called relations. Relations have a definite structure, as opposed to the total lack of any definition for the elements in more abstract systems. Thus, the definition of a relation is inherently less abstract. So relational algebra is not defined in the manner of an abstract algebra (rings, fields, vector spaces, etc.). Instead, its level of abstraction is analogous to the algebra of integers, real numbers or matrices; these specific examples of algebraic systems start out with an assumed structure for their elements that can be shown to satisfy the rules of their abstract counterparts (the set of integers is a ring, the set of real numbers is a field, the set of real matrices is a vector space). Although embodiments of the invention may not have a fully abstract counterpart for relational algebra, it may inherit concepts from the abstract realm, and a very important one is closure. Closure can be used to constrain the definitions of the operators in the relational algebra.

Wherever a relational operation is defined, that operator must yield a relation. And, given a particular instance of its operands, such an operation may not be possible. The first statement pertains to the algebraic closure of relational operations, the second pertains to the type sensitivity of these operators. This is a key element of embodiments of this invention.

Closure

To be clear, as used herein, closure refers to algebraic closure, rather than a "scoping closure" or some similar construct in computer programming. The closure property of a set of numbers can sometimes be taken for granted, since it seems trivial for most commonly used number systems. If one were to multiply two real numbers, the result would be another real number. It is much more difficult to define an operation upon a complex structure like a relation than upon a member of a concise number system. Relational operators must be carefully designed to maintain closure.

Type-Sensitive Operations

Violations of closure can occur in algebraic systems. Here are some examples:

If x represents a natural number, 2x is a valid expression, but the equation 2x=3 is not.

If x represents a rational number, $x^2$ is a valid expression, but the equation $x^2=2$ is not.

If x represents a real number, $x^2$ is a valid expression, but the equation $x^2=-1$ is not.

The algebraic expressions above are valid within each of their domains, yet these equations cannot be satisfied within the given number systems. Their solutions would violate closure. In relational algebra, the potential for undefined operations is great. But when the relations within the set of all relations are typed, and all the operators are type sensitive, one is free to use any relations as operands without being concerned with the exclusion of undefined operations. All operations are protected. In practice, embodiments of the invention (ADBMS) provide this open workflow automatically, warns, and do in fact return any relational results generated by these operations, including empty sets. For all the operators in relational algebra, the result of every operation shall be a relation, otherwise it is designated as undefined.

Relational Models, Database Management, Comparisons and Caveats

Embodiments of the invention provide a database management system. Although these relational models have an algebraic corollary, they are designed to create database software. The main purpose of relational algebra in these models is to provide an architectural foundation for implementation of interpreters for query languages, shells, specialized configuration tables and special purpose databases.

The purpose of embodiments of the invention is to migrate data and to further engineering and scientific exploration, while other concepts such as business rules, data integrity and referential integrity have lesser degrees of importance. Embodiments are designed for project level database manipulation. The ADBMS type system is meant to be transparent to the user.

As set forth above, AQL contains non-relational operators out of necessity, such as "outer join". All of these additional operators are closed as well.

Data Protection in AQL

Embodiments of the invention provide a great deal of user freedom at the occasional expense of referential integrity, business rules, authorization and transaction boundaries, but do have data integrity protections:

- Values that lie within the attribute domains are protected
- Scalar expressions are automatically checked for validity against the relation to which they are applied
- Data is checked for validity prior to the application of scalar expressions, however, for statistical expressions invalid values are counted.
- Operators are type sensitive
- Rapid diagnosis of database file corruption due to host system failures.

Accordingly, embodiments of the invention (e.g., AQL) were never intended to be a complete implementation of Codd, C. J. Date and Hugh Darwen's [Date, 2013], or any other language specification.

Algebraic Query Language

The above description contrasts specific aspects of algebraic systems, relational algebra and relational models. The following description delves into to the structure of AQL and the ADBMS. The language is introduced through its implementation of relational algebra. Thereafter, there will be short examples of code and syntax.

The Model of a Relation in AQL

FIG. 1 illustrates a pictorial representation of E. F. Codd's relation [Codd E. F., 1990]. The definition of a relation is shared by AQL and SQL. The models treat database tables as members of an infinite set of finite relations. The table has a header 102, attributes, logical/primary keys 104, attribute values 106, and attribute domains. The header 102 is the first row in the table, and the rows below the header are the records/tuples in the table. The header 102 contains names for each of the columns in the table. The header names 108 must be unique, duplications are forbidden. These columns are the attributes of the table. The values 106 found in each column are selected from a domain called attribute domain. Two distinct header names 108 can have identical attribute domains. The elements in each column are called the attribute values 106 or simply values. The rows of the table are called records or tuples 110. Each record 110 has a special combination of attributes (sometimes a single attribute) that uniquely identifies that record 110. This is commonly called a primary key 104; it is called a logical key in AQL. In FIG. 1, the table has a single attribute 'ID' that constitutes its logical key 104.

While relations by themselves can be very useful for query operations, the real utility of database systems comes when one can combine relations using relational operators.

Example Relational Operators in AQL

The categories of operators in AQL are:
The Fundamental Operator
Assignment Operators
Selection Operators
Join Operators
Function Operators
Type Database Administration Operators All operators are closed. Among these operators are six representative relational operators, including primitives, that will be described below.

Rename ρ (AQL < >)

The rename operator allows the user to change the attribute names 108 to whatever is deemed useful. FIG. 2 illustrates an exemplary execution of the rename operator in accordance with one or more embodiments of the invention. The corresponding exemplary code is:

P< >@OBJECT=@OBJECT_NAME which changes the attribute OBJECT 202 in P to OBJECT_NAME 204.

Cartesian Product X (AQL **)

FIG. 3 illustrates an exemplary execution of the Cartesian Product operator in accordance with one or more embodiments of the invention. In AQL, the code for the relational Cartesian product operator of two relations P and Q is P ** Q, which is defined by:

P ** Q={(c, d)|c∈P and d∈Q}

The attribute names for P and Q must be disjoint sets. The Cartesian product of P with records of length n, and of Q with records of length m, must be P ** Q with the records of length n+m. Note that the headers must be disjoint, otherwise the Cartesian product operator will produce a table with duplicate attribute names which is forbidden in the definition of a relation. This is a good example of how the definition of a relational operator is constrained by the closure requirement. AQL prevents a typing conflict, in this case, by forcing the headers to be disjoint.

Natural Join ⋈ (AQL &&)

FIG. 4 illustrates an exemplary execution of the Natural Join operator in accordance with one or more embodiments of the invention. The AQL code for natural join of P and Q is P && Q, which is defined by:

P && Q={r is a row|r=p∪q ∀p∈P and q
∈Q such that p and q are equal on their common attributes}

This is one of the most common and useful operations in relational algebra. It is a way to find new correlations between attributes, for example 'Name' and 'Manager'.

Projection Π (AQL :>)

The AQL code for the projection of P onto the set of attributes contained in the header of P:

P :> @A :@B

This operator can reduce the size of a table with many attributes, and it is useful when highlighting those of interest. It can also be useful in defining other more complex relational operators, which brings us to the division operator.

Division ÷ (AQL \\)

Figures 5, 6:
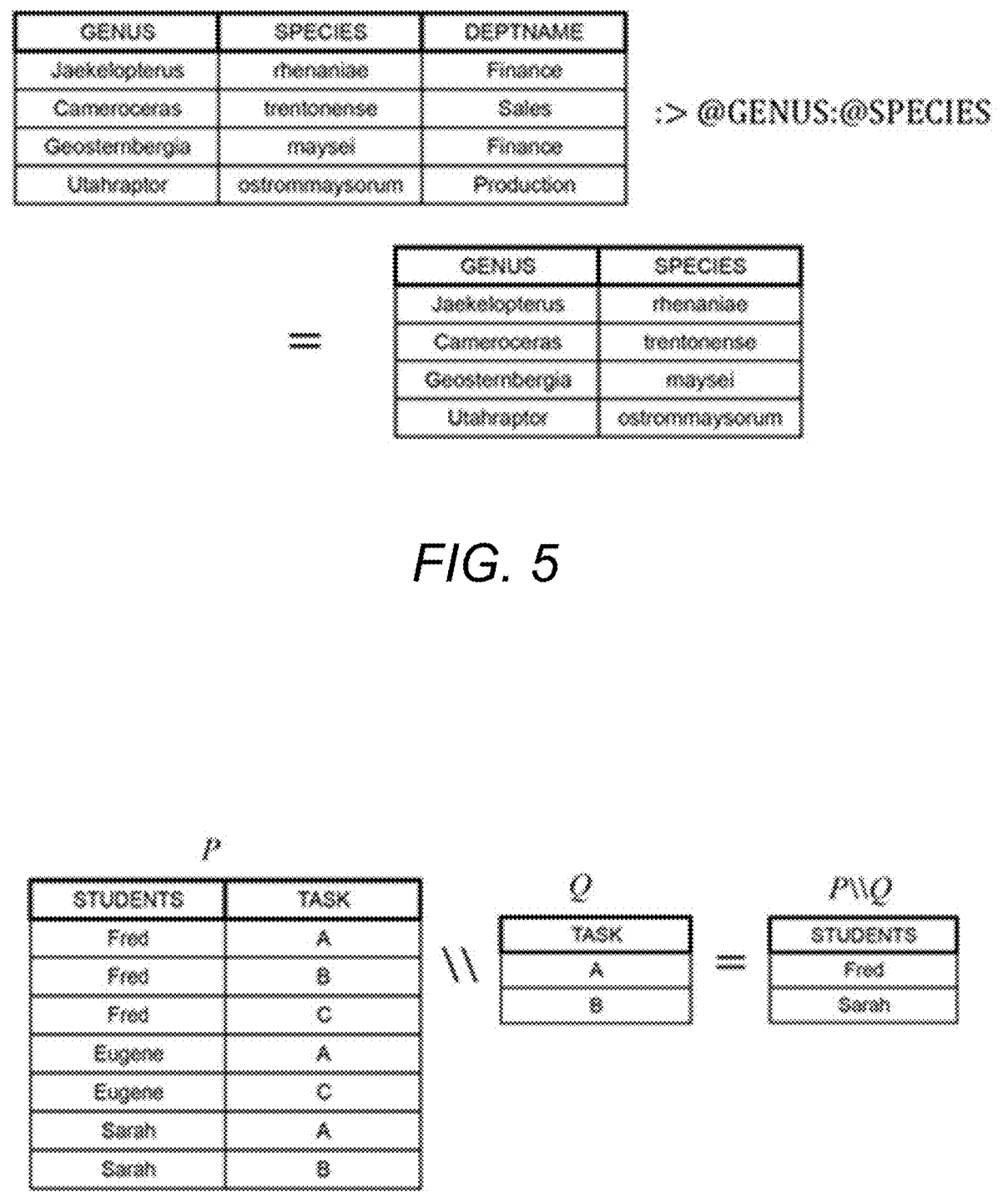

FIG. 6 illustrates the AQL code for P divided by Q is P\\Q in accordance with one or more embodiments of the invention. The division operator is a derived relational operator, meaning that it can be formed by a combination of the primitive operators above. Note that the header of Q must be contained in the header of P, otherwise the operation yields no records. This operation can be formed from combining the projection, Cartesian product and restriction operators, and therefore it is not a primitive relational operator.

Restriction (Selection) σ-(AQL ::)

In AQL code, the restriction of P by the conditional expression C, is P :: C. FIG. 7 illustrates an example of the restriction/selection operation in accordance with one or more embodiments of the invention. Suppose that in the table P of FIG. 7, one wishes to restrict results to rocks for which there is less than six samples, excluding obsidian, but adding those with fine texture:

P :: (@SAMPLES<6 & @IGNEOUS_ROCK .ne. "Obsidian")|@TEXTURE .eq. "Fine"

The result is illustrated in the bottom portion of FIG. 7.

Introduction to the AQL Database Management System

FIG. 8 illustrates an overview of the ADBMS in accordance with one or more embodiments of the invention. The ADBMS 800 consists of an interpreter 802, database file system 804, and typing system 806. The interpreter 802 reads and executes AQL queries submitted by the user (referred to herein as user/computer 808) using AQL root commands or the AQL Shell. The database file system 804 may be implemented with the BERKELEY DB INTERFACE. The AQL typing system 806 consists of a relational database, a type configuration table with a simple configuration language, and multi-user interface that provides each user 808 with their own area in which to perform database management or database analysis operations.

The ADBMS Type System 806

The meaning of "type" in this context comes from its meaning in computer languages. In programming languages, a type system 806 is a collection of rules that assign a property, called a type, to the various constructs—such as variables, expressions, functions or modules—in computer programs. The main purpose of a type system 806 is to reduce errors in computer programs by defining interfaces between different parts of the program, and then checking that the parts have been connected in a consistent way. Type systems also enforce semantics so that algebraic expressions written in the language don't violate typing rules. Thus, type systems 806 often impose compatibility constraints between their operators and operands. The compatibility between operators and operands is also a central issue in the definition of relational operators and their types in the ADBMS Type Database.

The type system 806 for the AQL relational model is called the ADBMS Type Database (ATD). The ATD was based upon the notion of a database skeleton [de Hann & Koppelaars, 2006]. The ATD is dynamic, automatic, and supports a multi-user system. The most common way that the AQL operators determine the type of their operands is by accessing the ATD at the time of execution. The use of the AQL operators on one or more of the databases in the system that store the relations triggers the ATD. Further, the typing system can hold in memory the type of each new relation generated by an AQL operator. When the user decides to commit the results of a query expression to the file system, the ADBMS type database is updated with the relation's type information. Every relation in the ADBMS has a type. The AQL operators access the ATD to both ensure that the operands are compatible via their types, and to store the type of the output relation.

To conform to the relational model, embodiments of the invention which are automated systems for typing relations must include information about:

1. the header of the relation;
2. the set of logical key attributes;
3. the physical key of the relation; and
4. the attribute constraints (given as regular expressions) for each attribute in the header. These are also used to validate data being brought into the ADBMS from outside sources, to validate data read from ADBMS database files 804 via a "fundamental operator" and to validate the results of computations performed by mathematical, statistical, or string expressions that are often parameters in the AQL function operators.

In addition, other information about the relation is included that doesn't pertain to type, for example, an arbitrary and editable "name." The ATD manages and tracks these properties, that are assigned to every relation in the ADBMS.

A type is assigned to each relation in one of three ways. First, as mentioned, the AQL operators automatically compute the type of their results as an integral part of their particular implementation. Secondly, types can be "hard-coded" in a Type Configuration Table using a simple Type Configuration Language. Lastly, the typing system conforms to the CRUD architecture. There are administrative operators that can create, read, update, and delete entries in the ATD.

The ATD allows an open workflow precisely because new relations, new attributes, with new structures, can always be added to the system via these mechanisms without knowledge of pre-existing types. For example, when users submit queries to the system, the type of the output relation may not be known to user at execution. AQL operators generate new types for their output at execution, without prior definition or user intervention. Also, by using the AQL assignment operators, intermediate results produced during query processing can be typed, saved, and referenced during and after query execution.

Type Sensitivity of Operations in the ATD

AQL operators (being type sensitive) use the ATD to check the type of their operands for compatibility.

Figure 9:
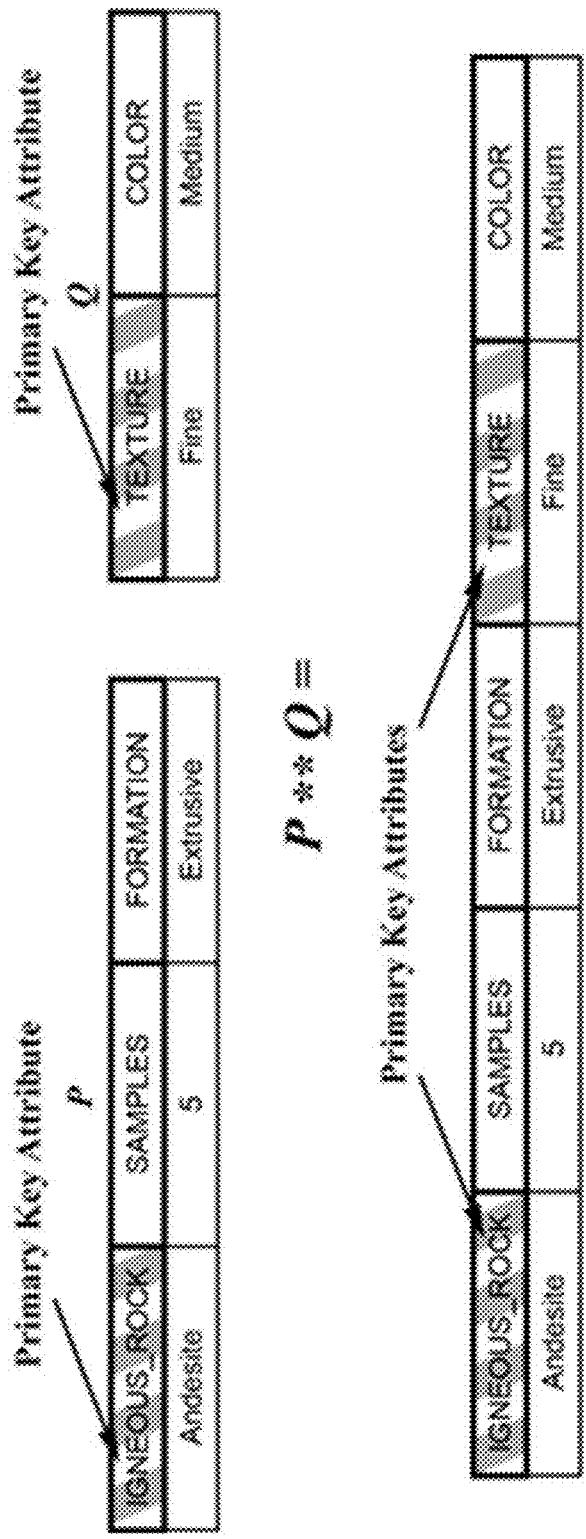
FIG. 9 illustrates a Cartesian product operation in accordance with one or more embodiments of the invention.

Regarding type sensitivity in the operators, some may be considered more sensitive than others. For example, in a comparison of the Cartesian product and the join operators, the nature of compatibility of the operands comes into sharper focus. As illustrated in FIG. 9, the Cartesian product (PQ) will take any two relations (e.g., P and Q) as operands so long as their headers are disjoint. As illustrated in FIG. 9**, the headers of relation P are disjoint from the headers of relation Q. As a result, an operator uses the ATD to check the P and Q operands and concludes they are compatible and can be used in the Cartesian product operation.

The output of the Cartesian product, though a relation, has a distinctly different structure in terms of its header names and domains: AQL renames the headers to enforce header disparity. On the other hand, the join operators must be equal on their common attributes. AQL does not enforce referential integrity in the join operator—consider a table where one record has a value that is a foreign key. If one were to join it to a table that doesn't have a record for that key, AQL would not include this record in the output, but would return the records that do have referential integrity. This is an exception to Codd, and another example of AQL's open architecture. AQL does not reject possibly useful information, even if the information is not complete.

Specialized ATD Administrative Operators

There are AQL operators that directly create, read, update, and delete ATD records only, without any other operators or other pre-existing ADBMS files involved. They are considered a separate category of function operators called ATD Administrative Operators. In normal use, these operators would rarely be used by users of AQL. However, they are crucial to system administration activities and are primarily used by system administrators to check the health of the ATD, resolve conflicts, and diagnose system failures should they occur.

The ATD Single and Multi-User System

This section provides an overview of how the Automated Typing Database works in the single and multi-user system.

The ADBMS provides a multi-user interface for the ATD. There are two tiers of access. One is the user tier that consists of a "local editable copy" instance of the ATD that belongs to a user and can be accessed by that user exclusively. The user tier is called the User Type Database (UTD). The second tier consists of a Type Database that is read-only but shared among all the users. Only the system administrator has full access to the second tier. The second tier is called the Shared Type Database (STD).

Single User System

Figure 10:
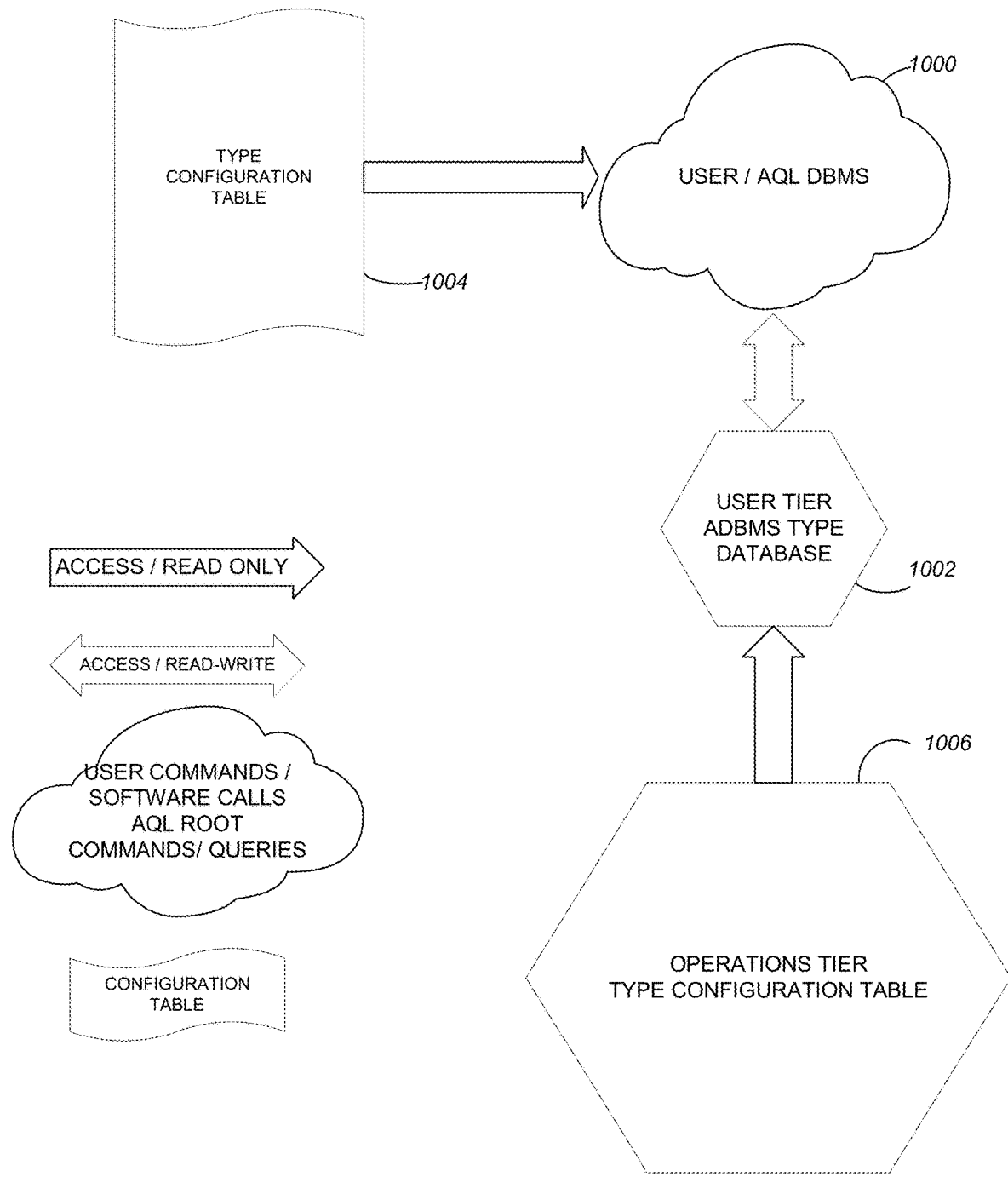
FIG. 10 illustrates the single user's view of the ADBMS two tier interface in accordance with one or more embodiments of the invention.

FIG. 10 illustrates the single user's view of the ADBMS two tier interface in accordance with one or more embodiments of the invention. The user 1000 has read/write access to their own UTD 1002. ATD Function Operators may be used to create, read, update, or delete records in the UTD 1002. Further, the user 1000 has read-only access to the type configuration table 1004 and the STD (i.e., the operations tier type configuration table 1006).

Multi-User System

Figure 11:
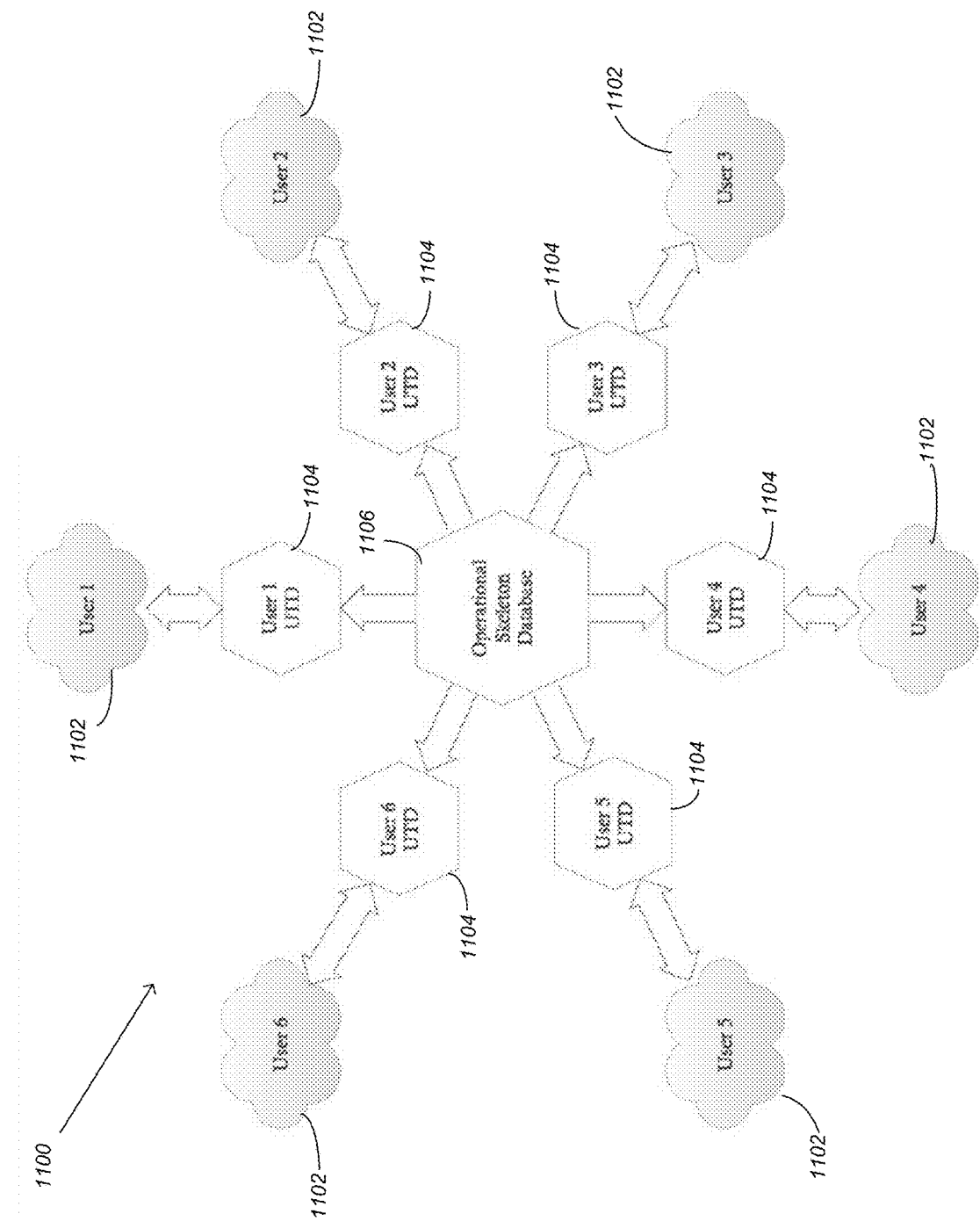
FIG. 11 illustrates a multi-user system/environment in accordance with one or more embodiments of the invention.

FIG. 11 illustrates a multi-user system/environment in accordance with one or more embodiments of the invention. In the Multi-User environment 1100, two or more users 1102 can create ADBMS files in their own environments that have the same names but different ADBMS types. The entries for these tables will be written into separate UTD's 1104. Since the users 1102 typically do not have write access to the STD 1106, their activities will avoid naming collisions and type conflicts. Accordingly, each user 1102 interacts with their own (local) UTD 1104 with read/write access, and with the shared type database 1106 with read only access.

Administrator Access

Figure 12:
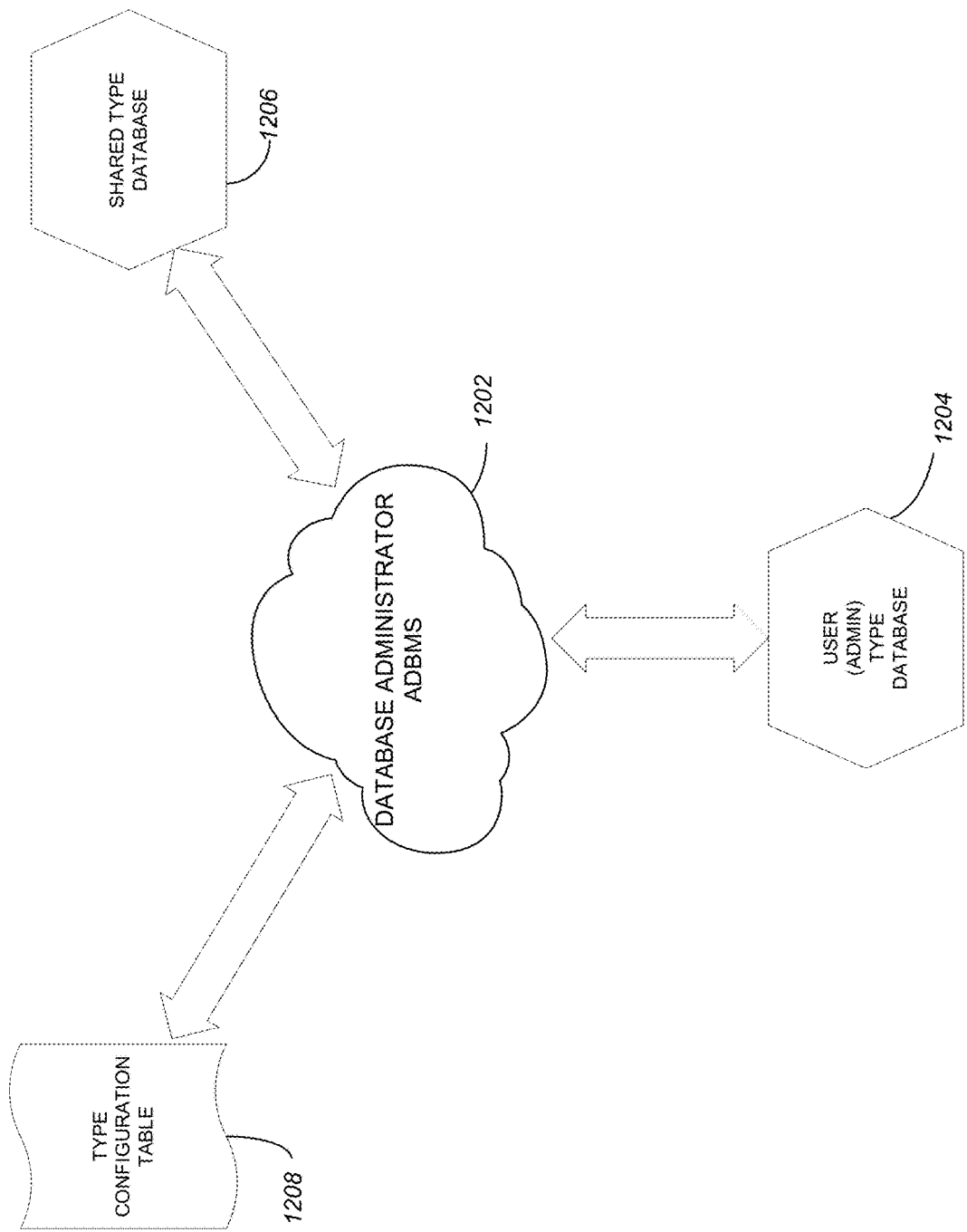
FIG. 12 illustrates an administrator environment/access in accordance with one or more embodiments of the invention.

FIG. 12 illustrates an administrator environment/access in accordance with one or more embodiments of the invention. The administrator 1202 has read/write access to a local type database (UTD) 1204, the shared type database (STD) 1206, and the type configuration table (TCT) 1208.

The AQL Scanner, Parser and Interpreter

Design Philosophy

The syntax of algebraic expressions provides a natural language for the formulation of database queries, and scientific and engineering analysis. In creating the AQL interpreter, the decision was made to use a design that can interpret and execute queries written in an algebraic syntax. Complicated mathematical structures such vectors and matrices are manipulated algebraically, meaning they are used in algebraic expressions. The matrix is homomorphic to the relation, and this suggests that relations should be handled in the syntax of algebra as well. The relations, though not strictly numerical, nor used only for numerical data, are fundamentally an algebraic structure.

Aspects of Internal Architecture

Figure 13:
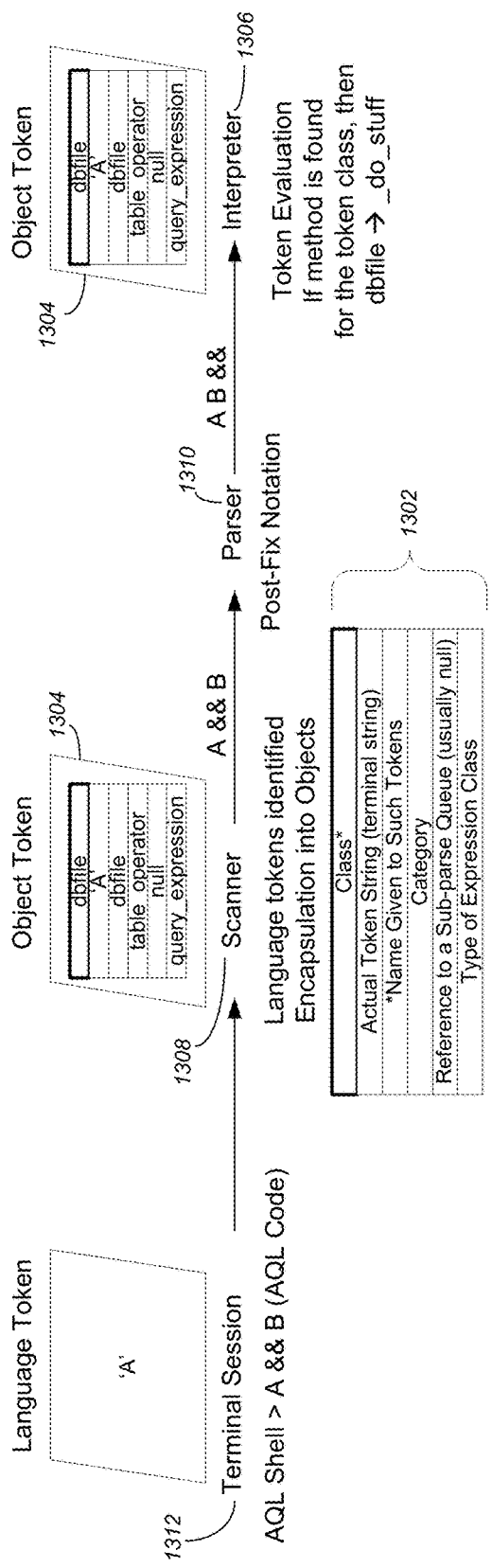
FIG. 13 illustrates aspects of the internal architecture of the AQL scanner, parser, and interpreter in accordance with one or more embodiments of the invention.

FIG. 13 illustrates aspects of the internal architecture of the AQL scanner, parser, and interpreter in accordance with one or more embodiments of the invention. AQL displays an interesting use of object-oriented design principles in the internal architecture of the scanner, parser and interpreter [Sipser, 1997], wherein polymorphism is exploited. There is a data structure 1302 for tokens 1304 that permits naming, and these named tokens 1304 correspond to object types in the interpreter 1306. Each object type has a method bound to it. That method is called by the same name in all object types. Therefore, these tokens 1304 can activate a method in the interpreter 1306 based upon their "name." A new function or operator can be added to the language simply by adding the token 1304 to the scanner 1308, and then instantiating an object in the interpreter 1306 that performs the intended operation. As a result, operations can be called as methods, and the process of expanding the operator base is streamlined.

Another feature of note is that tokens 1304 can contain sub-stacks of tokens, and in a sense the interpreter 1306 "calls itself" on this sub-stack of tokens. Accordingly, queries can be passed as arguments to the function operators.

Finally, while expressions are entered by the user in mid-fix format, the parser 1310 changes this to post-fix. Post-fix notation permits the completion of the computation of the operands before the operation is specified.

A user may invoke a terminal session 1312 to submit an AQL query (i.e., at an AQL shell prompt) consisting of a string of AQL language tokens. This is illustrated in FIG. 13. The query is passed to the AQL scanner 1308. The AQL scanner 1308 identifies and extracts the tokens of the AQL language from the input query. The scanner 1308 identifies the token, and based on various tables, places attributes of the token into an array that is named by the token name and becomes an object of its own type (e.g., object token 1304). The token object 1304 is referred to as the AQL token data structure. The token 1304 is pushed into the token queue. The token queue produced by the scanner 1308 is passed to the parser 1310 for processing into a parse queue. The parser converts the mid-fix expressions in the token queue into post-fix notation in the parse queue.

The scanner queue is used by the parser 1310 to create a parse tree for the interpreter 1306. The interpreter evaluates the tokens and if a method is found for the token class, then various corresponding operations are performed.

Matrix Algebra

Analogy with the n-by-m Matrices

There is an elegant and useful analogy between the set of n by m matrices, and the relations in the AQL model. In particular, analysis of the n by m matrices is used to illustrate and motivate the ATD.

Embodiments of the invention provide a model of the relation as a table. In comparison, a matrix in mathematics is defined as a rectangular array of numbers, symbols, or expressions, arranged in rows and columns. The dimensions of a matrix are defined as the number of rows by the number of columns. For example, the following is a 3×2 matrix of integers called M:

$$M = \begin{pmatrix} 2 & -1 \\ -1 & 2 \\ 4 & 3 \end{pmatrix}$$

The individual entries in a matrix are called the elements of the matrix. They are uniquely identified by the ordered pair (i,j), where i is the row number and j is the column number, and i takes values from 1 to 3, whereas j takes values from 1 to 2. Any element of matrix M can be expressed as $M_{i,j}$ with i and j as defined above. In our example, $M_{1,1}=2$, $M_{3,2}=3$, and $M_{2,2}=2$, and so on.

The structure of a matrix can be analyzed from the point of view of a relation or database with the following correspondence:

| Relational Algebra | AQL Relational Model | Matrix |
|---|---|---|
| Relation | Table | Rectangular Array |
| Tuple | Row in a Table (record) | Row in a Matrix |
| Attribute | Column in a Table | Column in a Matrix |
| Attribute Domain | Set of all Possible column Values | Type of all Elements |
| Domain Type | Type of the Relation | Dimension |

It follows that a matrix can be viewed as a relation where the header consists of the names 'row' and 1 to n, and the logical keys are the numbers 1 to m. Hence, the example matrix above can be translated into the following table:

| row | 1 | 2 |
|---|---|---|
| 1 | 2 | −1 |
| 2 | −1 | 2 |
| 3 | 4 | 3 |

Using the ATD type system, the type of this relation is:
1. Header for the relation: row, 1, 2
2. The set of primary key attributes: {row}
3. Physical key of the relation: @row
4. The attribute constraints given as PERL regular expressions for each attribute in the header, just one for each attribute: \d+(positive integers)
5. The ordering of the logical key values is numerical.

The matrix example now has a ADBMS type ("matrix"). Furthermore, for any given table that has a common attribute domain for all its header names, and where that domain is either an integer, real, complex, other mathematical construct, it is possible to convert its type to the "matrix" type defined by using the rename operator.

Note that an extra column for the row has been added, and that this column becomes the logical key for the table. The header names have been renamed without regard to order by their ordinal position in the header ($1^{st}$ name is 1, $2^{nd}$ name is 2, etc.).

Since any matrix can be said to have an ADBMS type, all the AQL operators can potentially be applied to this table.

It is also possible to add matrix operations to AQL relational operations, subject to the condition that the operands are of the matrix type.

Matrix Operations and Type Sensitivity

Operations such as matrix addition and multiplication, when viewed as operations on relations, can be said to be type sensitive. By definition [Herstein, 1975], matrix addition is constrained to matrices with the same dimensions. Furthermore, two matrices can multiplied if and only if the number of columns of the left operand is equal to the number of rows of the right operand. In both cases, elements of the matrix operands must also be compatible with addition or multiplication in order for the operations to be defined. Thus, matrix operations of addition and multiplication are type sensitive. In addition, the transpose operations for matrices, while applicable to a matrix of any dimension, will change their ATD 'type' by producing an output with the dimension reversed thus type of the output is determined by the type of the input under the ATD.

Other functions of matrices are similarly type sensitive. The determinant and trace of a matrix both take square matrices as arguments. Thus, the use of such functions in AQL expressions on relations being treated as matrices, must be checked by the ATD for type compatibility.

Conclusion

The n×m matrices can be viewed as relations by the ADBMS. The definition of a matrix can be used to type a matrix as a special type of a relation under the ATD. Conversely, the definition of a matrix suggests the manner in which a relation can be typed by seeing the type of a matrix as a special case of the more general type given to relations by the ATD. The n by m matrices motivated the definition of the type of a relation.

AQL Usage

GEO Project Background

Figure 14:
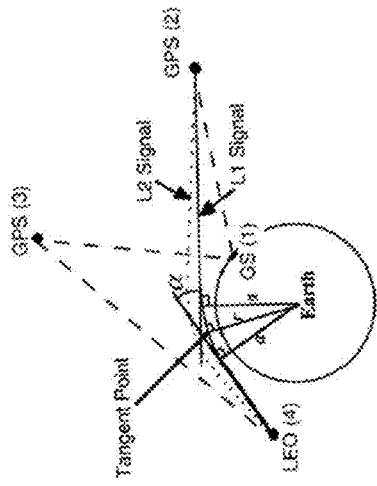
FIG. 14 illustrates GPS occultation geometry in accordance with one or more embodiments of the invention.

FIG. 14 illustrates GPS occultation geometry as background. More specifically, FIG. 14 illustrates the tangent point, the asymptote miss distance, a, and how the L1 and L2 signals travel slightly different paths due to the dispersive ionosphere. Also shown are the other non-occulting GPS transmitter and ground receiver used for calibration.

As described above, the GPS Earth Observatory is a program (at the JET PROPULSTION LABORATORY [JPL]) involved in climate, weather and ionospheric research. In recent years, the global positioning system (GPS) has been exploited via radio occultation techniques to obtain profiles of refractivity, temperature, pressure and water vapor in the neutral atmosphere and electron density in the ionosphere [Hajj, 2004].

The GPS constellation currently consists of 31 satellites at ~26,500 km radius, ~12 h period, orbiting in six different planes inclined at ~55°. These satellites are constantly rising and setting with respect to each other and LEO (low earth orbit) reference satellites. Very accurate measurements of the GPS signal frequency phase delays are correlated with this occultation data and used to measure atmospheric refractivity, which in turn yields abundant and accurate information on atmospheric conditions. These profiles are called by the GPS Occultation Analysis System "occultations" (these are not necessarily line-of-sight occultations). A single spacecraft can generate up to 600-700 occultations in a day.

In processing these signals, care must be taken to separate the numerous factors that can affect the occulted signal. These include the motion of the satellites, clock drifts, relativistic effects, the separation of the ionosphere and the neutral atmosphere, and the contribution of the upper atmosphere where sensitivity of the GPS signal is weak.

Figure 15:
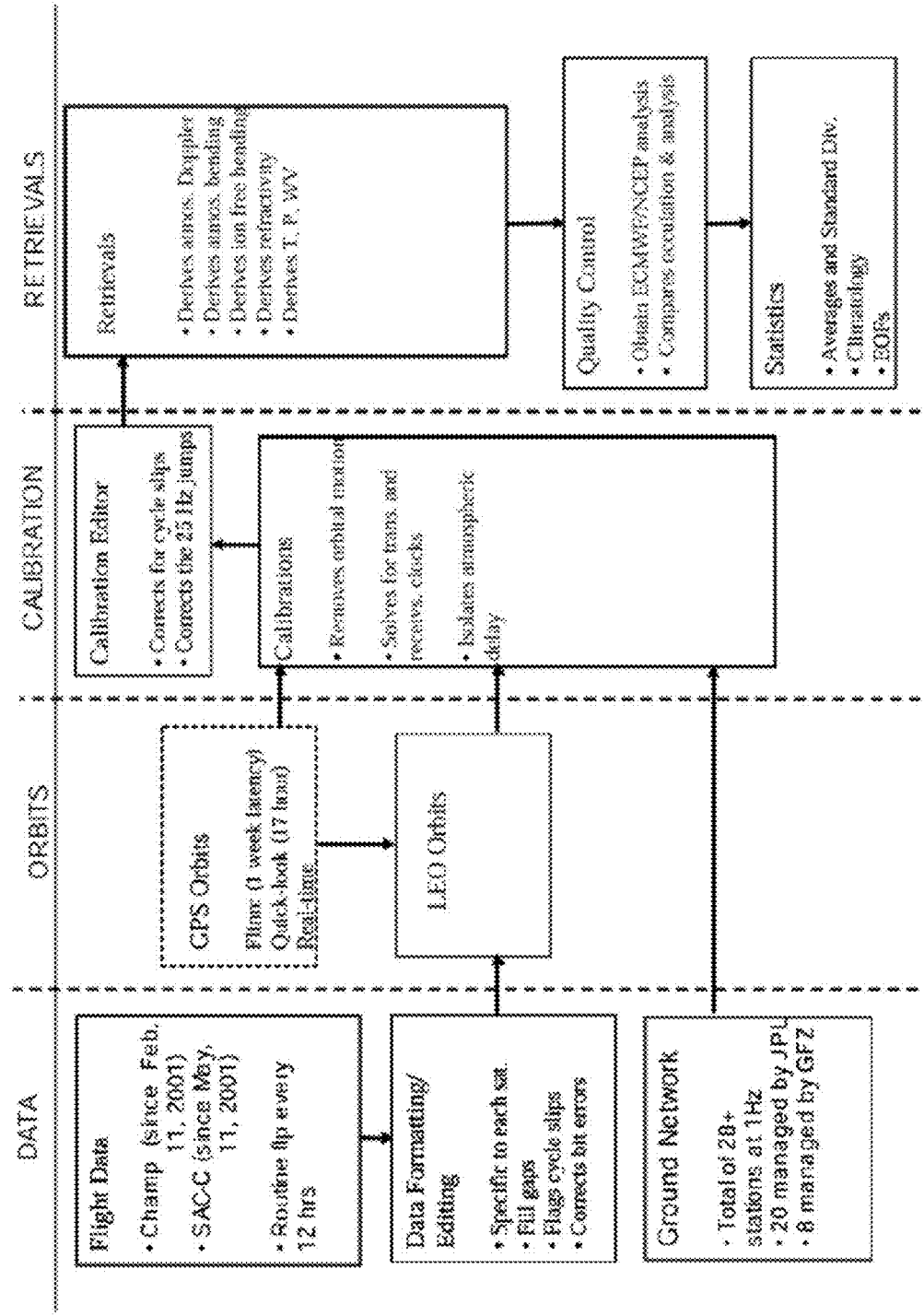
FIG. 15 illustrates the elements of the GPS Occultation Analysis System (GOAS) and the data.

FIG. 15 illustrates the elements of the GPS Occultation Analysis System (GOAS) and the data path to illustrate its general complexity and scale. The GOAS applies models to the phase delays in order to extract the desired physical data and to measure noise. All these effects modeled within GOAS can be adjusted to form the basis for different experiments. This generates an enormous variety of atmospheric models and data products. Over 150 databases exist in the GDI occultation system. The total occultation database is now over 2 TB in size, to date. Scripts are embedded into GOAS in six locations that write to the GDI (GEO Database Interface). Embodiments of the invention are then used to create and manage occultation databases that track the profile processing results throughout the GOAS system, and to determine the reason for any deviations that may arise from atmospheric data sets generated by other data centers. Satellite, latitude and longitude of occultation, computational strategy, date, start time, end time, status, failure mode and occultation reference satellite are among the parameters involved, along with several others.

A Case Study

Figure 16:
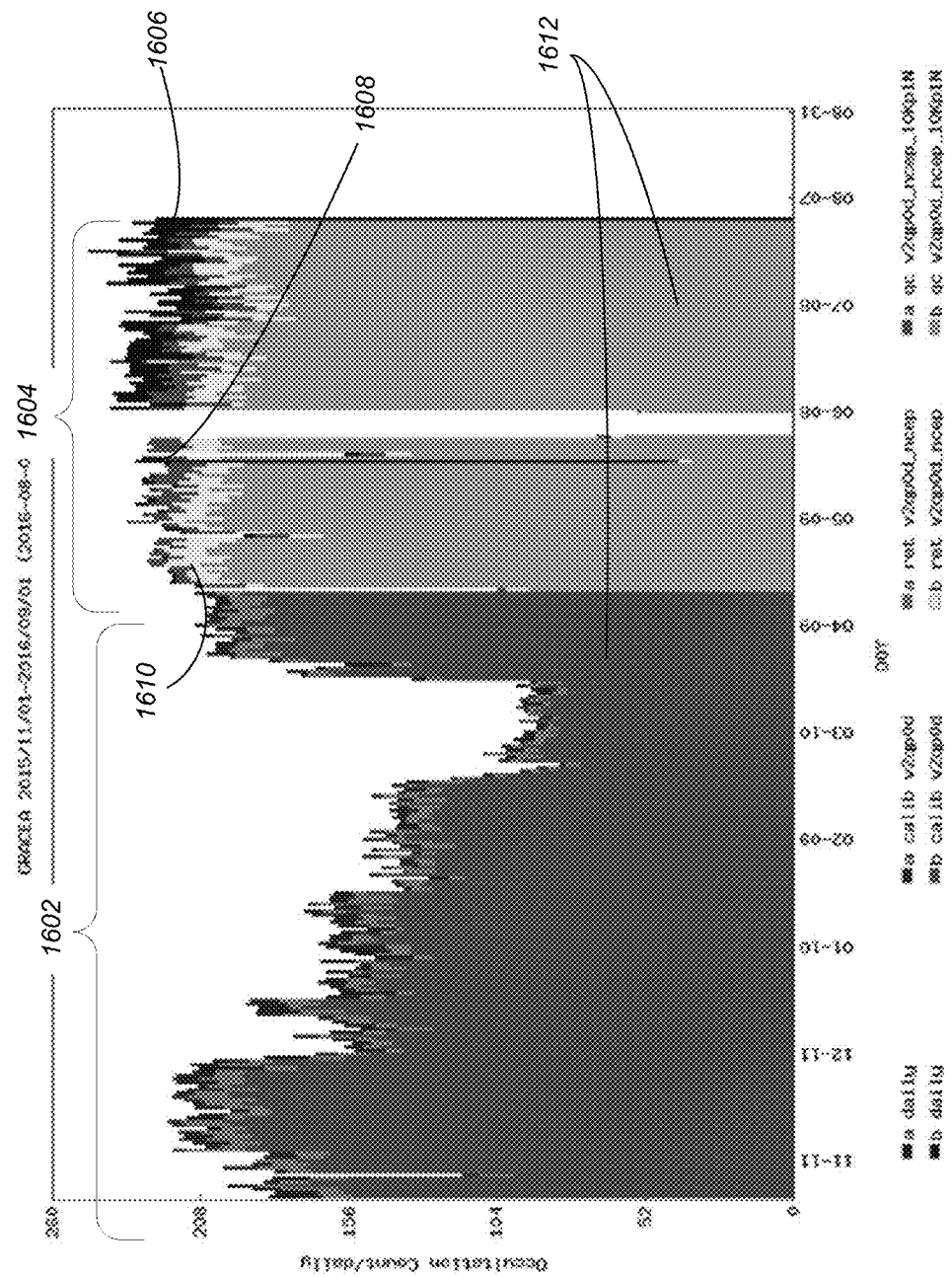
FIG. 16 illustrates a case study example of a throughput plot that has indicated a failure somewhere in the system in accordance with one or more embodiments of the invention.

One way that embodiments of the invention are used is to create throughput plots reflecting system performance. FIG. 16 illustrates a case study example of a throughput plot that has indicated a failure somewhere in the system in accordance with one or more embodiments of the invention.

The GRACEA and GRACEB satellites are used as references for the GEO project. This plot of FIG. 16 shows occultation counts per day. Data from GRACEA is shown in dark area 1602, GRACEB in light area 1604. The number of possible occultations are shown in height of area/shading 1606, the number of successful calibrations are in height of area/shading 1608, successful retrievals in height of area/shading 1610, and successful quality controls in height of areas/shading 1612. Any visible segments 1606 represent calibration failures. The relatively simple task presented as an example, was the use of embodiments of the invention to determine why GRACEB showed so many calibration failures as of Jul. 8 2016, when it came back online. There was a known failure mode attribute in the calibration databases: (@cfmode), but the rates of each failure mode were unknown.

An AQL command was issued to search GRACEB's calibration database using the AQL function operator "stats" (an operator that creates a table consisting of statistics derived from the records of an input table). This is an example of how AQL can search and compute in the same query.

The stats operator takes four arguments:
1. An AQL query. In this case graceb_c_v2qp0d><str=2012-06-08:: @cstatus . eq."FAILED"
2. The binning attribute @cfmode (the calibration failure mode). The occultation records are grouped by their failure modes.
3. The statistical expression 'count(@cfmode)', which counts each of the partitions with a non-null failure mode.
4. The name of the statistical attribute to use in the output table (relation). This is specifying a header name and attribute to use in the relation. The attribute domain will default to 'STRING', and the header name defaults to the ordinal value of the statistical expression in its list.

The following query expression was used:
stats(graceb_c_v2qp0d><str=2012-06-08:: @cstatus . eq."FAILED",@cfmode:@trs,count (@cfmode), @cfmode_cnt)

This expression from the inside query, outward is described:
This expression uses the fundamental operator to access the GRACEB database: "graceb_c_v2qp0d". This is a database in the shared database seat.
The operator was modified with the predicate operator to exclude all the records with successful status.
The splice operator was used to select all the records from July 8 to the end of the data.
The records were grouped by their calibration failure mode (@cfmode), then counted using the "count" statistical function.
Finally "stats", using these arguments, produced a table which consisted of the raw data count, calibration failure mode and calibration failure count.

This query searched 76,813 records in 7.23 seconds, actual CPU time 0.255 seconds and provided results in a table with a logical key, a @cfmode, a @cfmode_cnt, and a @rawcnt for the failures. Upon examining the resulting table, one can quickly discover that one of the records showed an unusually large failure count, for example:

| Logical Key | cfmode | cfmode cnt | rawcnt |
|---|---|---|---|
| Fail:tn clock data duration 0 < 30 | Fail:tn clock data duration 0 < 30 | 1507 | 1507 |

One of the system analysts on the GEO team could therefore speculate that this error was the result of a faulty GPS reference ground station. The query could then be enhanced by grouping on the terrestrial reference GPS station ID attribute @trs. The enhanced query enabled a conclusion that station number 49 was predominant among the 1507 errors. Station 49 was previously known to be unreliable, and it was ultimately determined that a software glitch allowed the calibration processing to use this station as a reference, and therefore introduced faulty data into the results. Accordingly, embodiments of the invention enabled the ability to quickly craft this additional query and run it in real time as the discussion unfolded. This is an example of the advantages of AQL's open workflow in a troubleshooting task.

The above case was somewhat trivial in comparison to other applications of AQL in analyzing GOAS data:
Co-locating occultations from different satellites based on latitude and longitude positioning and epoch;
Throughput comparison of the GOAS system against the UCAR system (University Corporation for Atmospheric Research, n.d.);
World distribution map of occultations over a 5'×5" grid;
The comparison plots of the system engineering parameters for each project that GEO studies; and
Database administration: 8-24 million transactions updating every record in the GEO Database performed in less than a day while maintaining data integrity constraints (prime example of rapid database migration).

Some of the examples shown above involved using AQL scripts. Each of these examples involved much more complex expressions and functions to perform their analyses.

Additional Applications

Embodiments of the invention may also include the use of AQL in Astrophysics, Bioinformatics, Genomic Analysis, Language Analysis, Particle Physics, Data Mining, Industrial Process Optimization, Materials Testing, Financial Modeling and Education. AQL would be an ideal educational tool, taught together with relational algebra, and as a pre-cursor tool. Further to the above, embodiments of the invention are used for the Inventory, Catalogue, and Tabulation of the GEO Science Data Units. For example, AQL may provide for the tracking of GEO science data units through the GEO science system software. AQL may also be used to partition GEO science data units into three data sets corresponding to the Northern (25° to 90°), Southern (−25° to −90°), and Tropics (−30° to +30°) to study the global distribution of occultation errors. AQL may also be used for error mode distribution among all the GEO projects, and may identify software design and implementation problems. Further, AQL may be used in the comparison of GEO science data units and other systems in order to diagnose GEO bugs at the calibration and retrieval stages.

Hardware Environment

Figure 17:
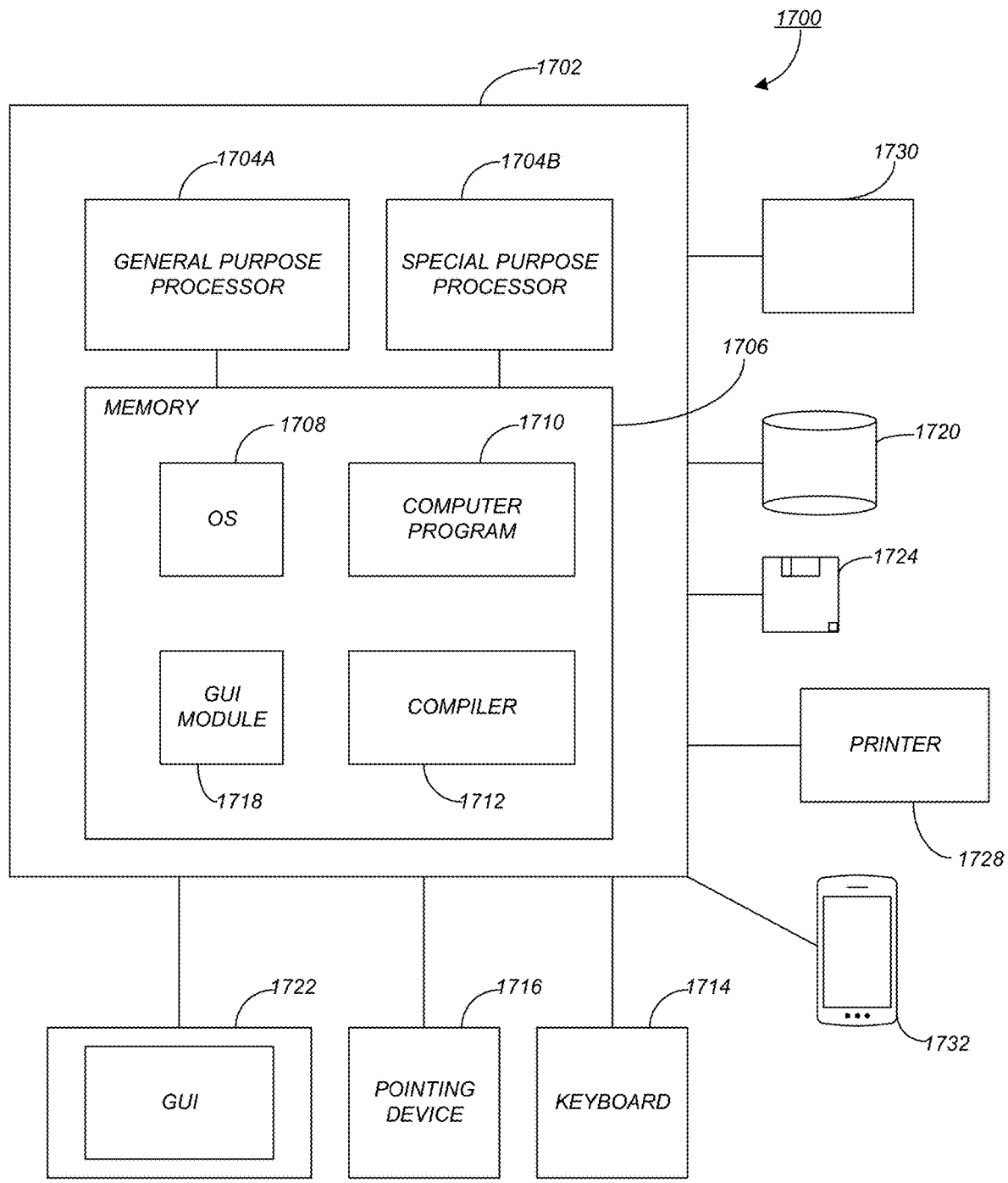
FIG. 17 is an exemplary hardware and software environment used to implement one or more embodiments of the invention.

FIG. 17 is an exemplary hardware and software environment 1700 used to implement one or more embodiments of the invention. The hardware and software environment includes a computer 1702 and may include peripherals. Computer 1702 may be a user/client computer, server computer, or may be a database computer. The computer 1702 comprises a general purpose hardware processor 1704A and/or a special purpose hardware processor 1704B (hereinafter alternatively collectively referred to as processor 1704) and a memory 1706, such as random access memory (RAM). The computer 1702 may be coupled to, and/or integrated with, other devices, including input/output (I/O) devices such as a keyboard 1714, a cursor control device 1716 (e.g., a mouse, a pointing device, pen and tablet, touch screen, multi-touch device, etc.) and a printer 1728. In one or more embodiments, computer 1702 may be coupled to, or may comprise, a portable or media viewing/listening device 1732 (e.g., an MP3 player, IPOD, NOOK, portable digital video player, cellular device, personal digital assistant, etc.). In yet another embodiment, the computer 1702 may comprise a multi-touch device, mobile phone, gaming system, internet enabled television, television set top box, or other internet enabled device executing on various platforms and operating systems.

In one embodiment, the computer 1702 operates by the general purpose processor 1704A performing instructions defined by the computer program 1710 under control of an operating system 1708. The computer program 1710 and/or the operating system 1708 may be stored in the memory 1706 and may interface with the user and/or other devices to accept input and commands and, based on such input and commands and the instructions defined by the computer program 1710 and operating system 1708, to provide output and results.

Output/results may be presented on the display 1722 or provided to another device for presentation or further processing or action. In one embodiment, the display 1722 comprises a liquid crystal display (LCD) having a plurality of separately addressable liquid crystals. Alternatively, the display 1722 may comprise a light emitting diode (LED) display having clusters of red, green and blue diodes driven together to form full-color pixels. Each liquid crystal or pixel of the display 1722 changes to an opaque or translucent state to form a part of the image on the display in response to the data or information generated by the processor 1704 from the application of the instructions of the computer program 1710 and/or operating system 1708 to the input and commands. The image may be provided through a graphical user interface (GUI) module 1718. Although the GUI module 1718 is depicted as a separate module, the instructions performing the GUI functions can be resident or distributed in the operating system 1708, the computer program 1710, or implemented with special purpose memory and processors.

In one or more embodiments, the display 1722 is integrated with/into the computer 1702 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 1702 according to the computer program 1710 instructions may be implemented in a special purpose processor 1704B. In this embodiment, some or all of the computer program 1710 instructions may be implemented via firmware instructions stored in a read only memory (ROM), a programmable read only memory (PROM) or flash memory within the special purpose processor 1704B or in memory 1706. The special purpose processor 1704B may also be hardwired through circuit design to perform some or all of the operations to implement the present invention. Further, the special purpose processor 1704B may be a hybrid processor, which includes dedicated circuitry for performing a subset of functions, and other circuits for performing more general functions such as responding to computer program 1710 instructions. In one embodiment, the special purpose processor 1704B is an application specific integrated circuit (ASIC).

The computer 1702 may also implement a compiler 1712 that allows an application or computer program 1710 written in a programming language such as PERL, C, C++, ASSEMBLY, SQL, PYTHON, PROLOG, MATLAB, RUBY, RAILS, HASKELL, or other language to be translated into processor 1704 readable code. Alternatively, the compiler 1712 may be an interpreter (as described above) that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1710 accesses and manipulates data accepted from I/O devices and stored in the memory 1706 of the computer 1702 using the relationships and logic that were generated using the compiler 1712.

The computer 1702 also optionally comprises an external communication device such as a modem, satellite link, Ethernet card, or other device for accepting input from, and providing output to, other computers 1702.

In one embodiment, instructions implementing the operating system 1708, the computer program 1710, and the compiler 1712 are tangibly embodied in a non-transitory computer-readable medium, e.g., data storage device 1720, which could include one or more fixed or removable data storage devices, such as a zip drive, floppy disc drive 1724, hard drive, CD-ROM drive, tape drive, etc. Further, the operating system 1708 and the computer program 1710 are comprised of computer program 1710 instructions which, when accessed, read and executed by the computer 1702, cause the computer 1702 to perform the steps necessary to implement and/or use the present invention or to load the program of instructions into a memory 1706, thus creating a special purpose data structure causing the computer 1702 to operate as a specially programmed computer executing the method steps described herein. Computer program 1710 and/or operating instructions may also be tangibly embodied in memory 1706 and/or data communications devices 1730, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1702.

Figure 18:
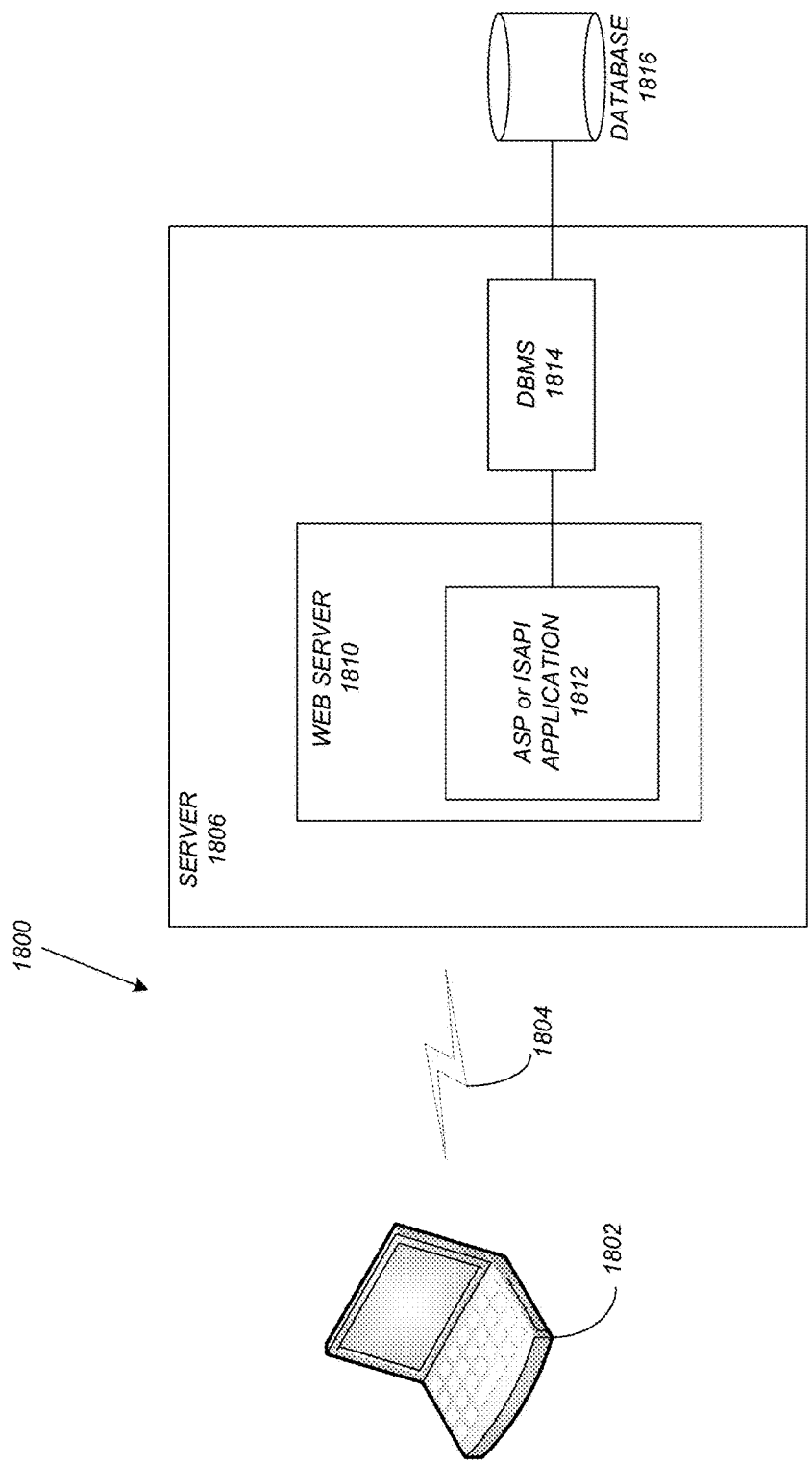
FIG. 18 schematically illustrates a typical distributed/cloud-based computer system using a network to connect client computers to server computers in accordance with one or more embodiments of the invention.

FIG. 18 schematically illustrates a typical distributed/cloud-based computer system 1800 using a network 1804 to connect client computers 1802 to server computers 1806. A typical combination of resources may include a network 1804 comprising the Internet, LANs (local area networks), WANs (wide area networks), SNA (systems network architecture) networks, or the like, clients 1802 that are personal computers or workstations (as set forth in FIG. 17), and servers 1806 that are personal computers, workstations, minicomputers, or mainframes (as set forth in FIG. 17). However, it may be noted that different networks such as a cellular network (e.g., GSM [global system for mobile communications] or otherwise), a satellite based network, or any other type of network may be used to connect clients 1802 and servers 1806 in accordance with embodiments of the invention.

A network 1804 such as the Internet connects clients 1802 to server computers 1806. Network 1804 may utilize ethernet, coaxial cable, wireless communications, radio frequency (RF), etc. to connect and provide the communication between clients 1802 and servers 1806. Further, in a cloud-based computing system, resources (e.g., storage, processors, applications, memory, infrastructure, etc.) in clients 1802 and server computers 1806 may be shared by clients 1802, server computers 1806, and users across one or more networks. Resources may be shared by multiple users and can be dynamically reallocated per demand. In this regard, cloud computing may be referred to as a model for enabling access to a shared pool of configurable computing resources.

Clients 1802 may execute a client application or web browser and communicate with server computers 1806 executing web servers 1810. Such a web browser is typically a program such as MICROSOFT INTERNET EXPLORER, MOZILLA FIREFOX, OPERA, APPLE SAFARI, GOOGLE CHROME, etc. Further, the software executing on clients 1802 may be downloaded from server computer 1806 to client computers 1802 and installed as a plug-in or ACTIVEX control of a web browser. Accordingly, clients 1802 may utilize ACTIVEX components/component object model (COM) or distributed COM (DCOM) components to provide a user interface on a display of client 1802. The web server 1810 is typically a program such as MICROSOFT'S INTERNET INFORMATION SERVER.

Web server 1810 may host an Active Server Page (ASP) or Internet Server Application Programming Interface (ISAPI) application 1812, which may be executing scripts. The scripts invoke objects that execute business logic (referred to as business objects). The business objects then manipulate data in database 1816 through a database management system (DBMS) 1814. Alternatively, database 1816 may be part of, or connected directly to, client 1802 instead of communicating/obtaining the information from database 1816 across network 1804. When a developer encapsulates the business functionality into objects, the system may be referred to as a component object model (COM) system. Accordingly, the scripts executing on web server 1810 (and/or application 1812) invoke COM objects that implement the business logic. Further, server 1806 may utilize MICROSOFT'S TRANSACTION SERVER (MTS) to access required data stored in database 1816 via an interface such as ADO (Active Data Objects), OLE DB (Object Linking and Embedding DataBase), or ODBC (Open DataBase Connectivity).

Generally, these components 1800-1816 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1802 and 1806 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1802 and 1806. Thus, embodiments of the invention may be implemented as a software application on a client 1802 or server computer 1806. Further, as described above, the client 1802 or server computer 1806 may comprise a thin client device or a portable device that has a multi-touch-based display.

Logical Flow

FIG. 19 illustrates the logical flow for maintaining an algebraic database management system (ADBMS) in accordance with one or more embodiments of the invention.

At step 1900, a query is received (e.g., from a user via a user interface). The query utilizes a syntax that is modeled on relational algebra.

At step 1902, an ADBMS type system is maintained. The ADBMS includes an ADBMS type database (ATD). The ADBMS type system is a collection of rules that assign a type to constructs. The ATD is a catalog, where each record in the catalog holds typing information for a data type. Although not limited to a particular structure, an exemplary ATD structure includes, for each record: a list of attributes; a set of logical key attributes; and an attribute constraint for each attribute in the list of attributes and each logical key attribute. The ADBMS type system may also include a type configuration table (TCT) that includes configuration information for pre-defined data types. The interpreter reads the TCT, builds the pre-defined data types, and uses the pre-defined data types to validate the inputs and/or validate results of scalar expressions that are used in the query. In one or more embodiments, the pre-defined data types are string constants that represent data types, a type of a relation, and one or more attribute constraints that validate the inputs and/or the results of scalar expressions. In addition, the pre-defined data types may include one or more business rules that enforce an integrity of the inputs and constraints on the inputs.

At step 1904, the query is dynamically processed at execution time (in an interpreter). Steps 1906-1914 provides the details for the dynamic processing.

At step 1906, the inputs of the query are determined.

At step 1908, the ATD is searched for a data type of each of the inputs.

At step 1910, compatibility between each of the data types of the inputs is determined (based on an operator of the query).

At step 1912, a resultant of the query and a data type of the resultant of the query are determined (based on the operator of the query). An exemplary data type of the resultant is a relational table (although embodiments of the invention are not limited to relational table resultants).

At step 1914, the resultant of the query is saved/output (e.g., to a file). The saving includes adding a new record in the catalog. The new record provides/specifies/defines the data type of the resultant. In one or more embodiments, the query may be a scalar expression that, when executed by the interpreter, results in numerical, string, and/or logical constants. Such a scalar expression may be a statistical expression that acts on sets of records and produces an aggregate value for each set. Alternatively, or in addition, the scalar expression may be a string expression that includes strings and/or string functions.

Further to the above, in one or more embodiments of the invention, there may be two tiers of access to the ATD. The first tier of the two tiers is a user type database that belongs to a user that can be accessed by the user and an administrator exclusively. The second tier of the two tiers is a shared type database that is shared among multiple users, wherein the multiple users have read-only access to the shared type database, and the administrator has read-write access to the shared type database.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. In summary, embodiments of the invention provide the ability to use AQL for the rapid prototyping of concise, intuitive relational and computational queries. It is an agile data migration tool which allows an open and rapid workflow. In addition, the ADBMS maintains strict data integrity constraints through an innovative architecture. It provides data protection through closure, type-safety, type sensitive operators, the typing of the class of relations, an Automatic Typing System, and the CRUD architecture. In addition, via a unique scanner, parser and interpreter design, it is easily extensible: new operators, tokens, and attribute domains can be quickly added to the system through the production of token data structures.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

Each of the following publications are incorporated by reference herein.

Aho, A. V., Lam, M. S., Sethi, R., & Ullman, J. D. (1986). Compliers Principles, Techniques, & Tools. In A. V. Aho, M. S. Lam, R. Sethi, J. D. Ullman, M. Hersch, M. Goldstein, K. Harutunian, & J. Holcom (Eds.), *Compliers Principles, Techniques, & Tools* (2nd Edition ed.). Boston, Mass., USA: Adison Wesley.

Chao, L. (2006). Database Development and Management. In L. Chao, & T. &. Group (Ed.), *Database Development and Management* (1st Edition ed.). Boca Raton, Fla., USA: Auerback Publications.

Codd, E. F. (1970, June). A Relational Model of Data for Large Shared Data Banks. *Communications of the ACM,* 13(6), pp. 377-387.

Codd, E. F. (1990). The Relational Model For Database Management. In E. F. Codd, *The Relational Model For Database Management* (Vol. 2, p. 538). Menlo Park, Calif.: Addison-Wesley.

Computing, W. (2015, Mar. 25). *Relational Algebra*, current –862. (WKALT, Editor, W. Computing, Producer, & WikiProject Computing) Retrieved from Wikipedia: http://en.wikipedia.org/wiki/Relational_algebra Date, C. (2013). Relational Theory for Computer Professionals: What Relational Databases are All About. In C. Date, & A. Oram (Ed.), *Relational Theory for Computer Professionals: What Relational Databases are All About* (First Edition ed.). O'Reilyy.

de Hann, L., & Koppelaars, T. (2006). Database Skeleton. In L. de Hann, T. Koppelaars, & J. Gennick (Ed.), *Applied Mathematics for Database Professionals* (1st Edition ed., pp. 144-147). New York, N.Y., USA: Apress.

Hajj, G. A. (2004, Oct. 29). CHAMP and SAC-C atmospheric occultation results and intercomparisons. *Journal of Geophysical Research,* 109, 24.

Herstein, I. N. (1975). Topics In Algebra. In I. N. Herstein, *Topics In Algebra* (Second Edition ed., p. 388). Lexington, Mass.: Xerox College Publishing.

Perlman, M. (n.d.). Abstract Algebra. In M. Perlman, *Abstract Algebra*. La Canada, California, Los Angeles.

Relational Database. (2015, Mar. 2). *Relation (database)*. (W. Databases, Producer, & WikiProject Databases) Retrieved from Wikipedia: http://en.wikipedia.org/wiki/Relation_(database)

Scott, M. L. (2009). Programming Language Pragmatics. In M. L. Scott, *Programming Language Pragmatics* (3d Edition ed.). Burlington, Mass., USA: Morgan Kaufmann Publishers.

Seltzer, M., & Bostic, K. (1994). *Berkeley DB*. (WikiComputing, Editor, Oracle, Producer, & Oracle (formerly Sleepycat Software)) Retrieved Jul. 10, 2014, from Wikipedia: http://en.wikipedia.org/wiki/Berkeley_DB Sipser, M. (1997). Introduction to the Theory of Computation. In M. Sipser, D. Dietz, & S. Garland (Eds.), *Introduction to the Theory of Computation* (1st Edition ed.). Boston, Mass., USA: PWS Publishing Company. *University Corporation for Atmospheric Research*. (n.d.). Retrieved from NCAR/UCAR: http://www2.ucar.edu WikiProject Computing. (2014, Jul. 10). *Berkeley DB*. Retrieved from Wikipedia: http://en.wikipedia.org/wiki/Talk:Berkeley_DB WikiProjects. (2015, May 16). *Production (computer science)*. (Wikimedia Foundation, Inc) Retrieved from Wikipedia Encyclopedia: https://en.wikipedia.org/wiki/Production_(computer science)

WikiProjects. (2016, Mar. 4). *Chomsky Hierarchy*. (WikiProject Computing) Retrieved from Wikipedia Encyclopedia: https://en.wikipedia.org/wiki/Chomsky_hierarchy WikiProjects Computing. (2015, Apr. 7). *Relational Database*. (W. Computing, Producer, & WikiProjects Computing) Retrieved from Wikipedia: http://en.wikipedia.org/wiki/Talk:Relational_database

What is claimed is:

1. A computer-implemented method for maintaining an algebraic database management system (ADBMS), comprising:
   (a) receiving a query, wherein the query utilizes a syntax that is modeled on relational algebra, and wherein the syntax conforms to obeys the same grammar rules as relational algebra;
   (b) maintaining an ADBMS type system comprising an ADBMS type database (ATD), wherein:
      (1) the ADBMS type system comprises a collection of rules that assign a type to constructs, wherein the ADBMS type system:
         (A) defines interfaces between different parts of a program;
         (B) checks that the different parts are connected in a consistent way;
         (C) enforces semantics so that expressions written in the syntax do not violate typing rules;
      (2) the ATD comprises a catalog, wherein:
         (A) each record in the catalog holds typing information for a data type;
         (B) the ATD is used to create data types, read data types, update data types and delete data types in the catalog;
         (C) the catalog comprises a relational database;
         (D) at least one data type in the ATD comprises a relation; and
         (E) the ATD is accessed and used to ensure operands are compatible via their data types; and
      (3) a structure of the ATD comprises, for each record:
         (A) a list of attributes;
         (B) a set of logical key attributes; and (C) an attribute constraint for each attribute in the list of attributes and each logical key attribute;
(c) dynamically processing, at execution time, the query, in an interpreter, by:
(1) determining the inputs of the query;
(2) accessing and searching the ATD, at execution time, for an input data type of each of the inputs;
(3) computing a resultant data type by:
(A) determining compatibility between each of the input data types of the inputs based on an operator of the query;
(B) determining a resultant of the query, wherein the resultant operates on the data in the database; and
(C) determining a new resultant data type of the resultant of the query, wherein the new resultant data type determination is based on the operator of the query, and wherein the new resultant data type is a new data type that was not known prior to the execution time; and
(4) outputting the resultant of the query, wherein the outputting comprises adding and storing a new record in the catalog, wherein the new record comprises the new resultant data type, and wherein the new resultant data type is reused by later queries.

2. The computer-implemented method of claim 1, wherein the query is received from a user via a user interface.

3. The computer-implemented method of claim 1, wherein:
the ADBMS type system further comprises a type configuration table (TCT);
the TCT comprises configuration information for pre-defined data types; and
the interpreter:
reads the TCT;
builds the pre-defined data types; and
uses the pre-defined data types to validate the inputs and/or validate results of scalar expressions that are used in the query.

4. The computer-implemented method of claim 3, wherein the pre-defined data types comprise:
string constants that represent data types;
a type of a relation; and
one or more attribute constraints that validate the inputs and/or the results of scalar expressions.

5. The computer-implemented method of claim 4, wherein pre-defined data types further comprise:
one or more business rules that enforce an integrity of the inputs and constraints on the inputs.

6. The computer-implemented method of claim 1, wherein the data type of the resultant is a relational table.

7. The computer-implemented method of claim 1, wherein:
there are two tiers of access to the ATD;
the first tier of the two tiers comprises a user type database that belongs to a user that can be accessed by the user and an administrator exclusively;
the second tier of the two tiers comprises a shared type database that is shared among multiple users, wherein the multiple users have read-only access to the shared type database, and the administrator has read-write access to the shared type database.

8. The computer-implemented method of claim 1, wherein:
the query comprises a scalar expression that when executed by the interpreter results in numerical, string, and/or logical constants.

9. The computer-implemented method of claim 8, wherein:
the scalar expression comprises a statistical expression that acts on sets of records and produces an aggregate value for each set.

10. The computer-implemented method of claim 8, wherein:
the scalar expression comprises a string expression that includes strings and/or string functions.

11. A system for maintaining an algebraic database management system (ADBMS) in computer system comprising:
(a) a computer having a memory and a processor;
(b) an ADBMS type system comprising an ADBMS type database (ATD) on a computer, wherein:
(1) the ADBMS type system comprises a collection of rules that assign a type to constructs, wherein the ADBMS type system:
(A) defines interfaces between different parts of a program;
(B) checks that the different parts are connected in a consistent way;
(C) enforces semantics so that expressions written in the syntax do not violate typing rules; and
(2) the ATD comprises a catalog, wherein:
(A) each record in the catalog holds typing information for a data type;
(B) the ATD is used to create data types, read data types, update data types and delete data types in the catalog;
(C) the catalog comprises a relational database;
(D) at least one data type in the ATD comprises a relation;
(E) the ATD is accessed and used to ensure operands are compatible via their data types; and
(F) a structure of the ATD comprises, for each record:
(i) a list of attributes;
(ii) a set of logical key attributes; and
(iii) an attribute constraint for each attribute in the list of attributes and each logical key attribute;
(c) an interpreter, executing on the computer, that:
(1) receives a query, wherein the query utilizes a syntax that is modeled on relational algebra, and wherein the syntax conforms to and obeys the same grammar rules as relational algebra;
(2) dynamically processes, at execution time, the query by:
(i) determining the inputs of the query;
(ii) accessing and searching the ATD, at execution time, for a data type of each of the inputs;
(iii) computing a resultant data type by:
(A) determining compatibility between each of data types of the inputs based on an operator of the query;
(B) determining a resultant of the query, wherein the resultant operates on the data in the database; and
(C) determining a new resultant data type of the resultant of the query, wherein the new resultant data type determination is based on the operator of the query, and wherein the new resultant data type is a new data type that was not known prior to the execution time; and
(iv) outputting the resultant of the query, wherein the outputting comprises adding and storing a new record in the catalog, wherein the new record comprises the new data type of the resultant, and wherein the new resultant data type is reused by later queries.

12. The system of claim 11, wherein the query is received from a user via a user interface.

13. The system of claim 11, wherein:
the ADBMS type system further comprises a type configuration table (TCT);
the TCT comprises configuration information for pre-defined data types; and
the interpreter:
  reads the TCT;
  builds the pre-defined data types; and
  uses the pre-defined data types to validate the inputs and/or validate results of scalar expressions that are used in the query.

14. The system of claim 13, wherein the pre-defined data types comprise:
string constants that represent data types;
a type of a relation; and
one or more attribute constraints that validate the inputs and/or the results of scalar expressions.

15. The system of claim 14, wherein pre-defined data types further comprise:
one or more business rules that enforce an integrity of the inputs and constraints on the inputs.

16. The system of claim 11, wherein the data type of the resultant is a relational table.

17. The system of claim 11, wherein:
there are two tiers of access to the ATD;
the first tier of the two tiers comprises a user type database that belongs to a user that can be accessed by the user and an administrator exclusively;
the second tier of the two tiers comprises a shared type database that is shared among multiple users, wherein the multiple users have read-only access to the shared type database, and the administrator has read-write access to the shared type database.

18. The system of claim 11, wherein:
the query comprises a scalar expression that when executed by the interpreter results in numerical, string, and/or logical constants.

19. The system of claim 18, wherein:
the scalar expression comprises a statistical expression that acts on sets of records and produces an aggregate value for each set.

20. The system of claim 18, wherein:
the scalar expression comprises a string expression that includes strings and/or string functions.

* * * * *